(12) United States Patent
Sun et al.

(10) Patent No.: US 12,200,294 B2
(45) Date of Patent: Jan. 14, 2025

(54) DEVICE RECOMMENDATION METHOD AND ELECTRONIC DEVICE

(71) Applicant: Honor Device Co., Ltd., Shenzhen (CN)

(72) Inventors: Xue Sun, Shenzhen (CN); Yanhui Yu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/928,745

(22) PCT Filed: Aug. 26, 2021

(86) PCT No.: PCT/CN2021/114838
§ 371 (c)(1),
(2) Date: Nov. 30, 2022

(87) PCT Pub. No.: WO2022/110939
PCT Pub. Date: Jun. 2, 2022

(65) Prior Publication Data
US 2023/0232066 A1 Jul. 20, 2023

(30) Foreign Application Priority Data

Nov. 27, 2020 (CN) .......................... 202011360717.9
Apr. 30, 2021 (CN) .......................... 202110483159.3

(51) Int. Cl.
*H04N 21/436* (2011.01)
*H04N 21/485* (2011.01)

(52) U.S. Cl.
CPC ..... *H04N 21/43615* (2013.01); *H04N 21/485* (2013.01)

(58) Field of Classification Search
CPC ......... H04N 21/44213; H04N 21/2187; H04N 21/4532
See application file for complete search history.

(56) References Cited

U.S. PATENT DOCUMENTS

| 10,177,864 | B2 | 1/2019 | Nagase |
| 2008/0039018 | A1 | 2/2008 | Kim |

(Continued)

FOREIGN PATENT DOCUMENTS

| CN | 107431781 A | 12/2017 |
| CN | 109120970 A | 1/2019 |

(Continued)

*Primary Examiner* — Chenea Davis
(74) *Attorney, Agent, or Firm* — Rimon PC

(57) ABSTRACT

This application provides a device recommendation method and an electronic device, and relates to the terminal field. The method includes: receiving, by a first device, a first operation of enabling a first service by a user; in response to the first operation, separately obtaining, by the first device from N electronic devices, device parameters associated with the first service, where the N electronic devices and the first device are located in a same communication network; predicting, by the first device according to the device parameters, quality of service of executing the first service by each electronic device of the N electronic devices; and displaying, by the first device, a device list according to the quality of service of executing the first service by each electronic device in the N electronic devices, where the device list includes a device identifier of at least one electronic device in the N electronic devices.

20 Claims, 21 Drawing Sheets

(56) References Cited

U.S. PATENT DOCUMENTS

| | | | |
|---|---|---|---|
| 2011/0138064 A1* | 6/2011 | Rieger | G06F 16/9577 |
| | | | 707/715 |
| 2012/0324362 A1 | 12/2012 | Jung et al. | |
| 2016/0255398 A1 | 9/2016 | Lee et al. | |
| 2017/0168772 A1 | 6/2017 | Lim | |
| 2017/0171280 A1 | 6/2017 | Kim | |
| 2017/0201605 A1* | 7/2017 | Le Rouzic | H04L 65/1104 |
| 2020/0383170 A1* | 12/2020 | Ganapathy | H04W 84/18 |
| 2021/0250395 A1* | 8/2021 | VanBlon | H04L 65/60 |
| 2022/0004315 A1 | 1/2022 | Zhang et al. | |
| 2022/0232445 A1 | 7/2022 | Shu et al. | |

FOREIGN PATENT DOCUMENTS

| | | |
|---|---|---|
| CN | 109660842 A | 4/2019 |
| CN | 109922205 A | 6/2019 |
| CN | 111294625 A | 6/2020 |
| CN | 111580923 A | 8/2020 |
| CN | 111796784 A | 10/2020 |
| WO | 2020082373 A1 | 4/2020 |

* cited by examiner

DEVICE RECOMMENDATION METHOD AND ELECTRONIC DEVICE

CROSS-REFERENCE TO RELATED APPLICATIONS

This application is a National Stage of International Application No. PCT/CN2021/114838, filed Aug. 26, 2021, which claims priority to Chinese Patent Application No. 202110483159.3, filed on Apr. 30, 2021, and Chinese Patent Application No. 202011360717.9, filed on Nov. 27, 2020, each of which is hereby incorporated by reference in their entireties.

TECHNICAL FIELD

This application relates to the field of terminals, and in particular, to a device recommendation method and an electronic device.

BACKGROUND

With rapid development of communication technologies, a user or a home often has a plurality of electronic devices that can communicate with each other. These electronic devices may work cooperatively to complete services in a distributed scenario. By using a screen projection service as an example, when a user watches a video by using a video APP in a mobile phone, the user may trigger the mobile phone to jointly execute a screen projection service with another device. For example, the mobile phone may project display data played in the video to a television at home, and at the same time, may project audio data played in the video to a loudspeaker box at home to obtain better video viewing experience.

However, when a plurality of devices jointly execute a service in a coordinated manner, a quality of service problem such as poorer audio quality, poorer display quality, or out-of-sync audio and video may occur due to a device performance difference or the like. For example, in the foregoing screen projection service, when the loudspeaker box has a relatively weak processing capability for the audio data and the television has a relatively strong processing capability for the display data, a delay 1 generated when the audio data is played by the loudspeaker box may be greater than a delay 2 generated when the display data is played by the television, thereby causing a problem that the display data played by the television is out of synchronization with the audio data played by the loudspeaker box. Therefore, how to improve quality of service when a plurality of devices work cooperatively in a distributed scenario becomes a problem that needs to be urgently solved.

SUMMARY

This application provides a device recommendation method and an electronic device. In a distributed scenario, a device with higher quality of service when a plurality of devices work cooperatively may be recommended to a user according to a service requirement, so as to improve quality of service when a plurality of devices work cooperatively and improve user experience.

To achieve the foregoing objective, the following technical solutions are used in this application:

According to a first aspect, this application provides a device recommendation method, including: A first device may receive a first operation of enabling a first service by a user; and in response to the first operation, the first device may separately obtain, from N (N is an integer greater than 0) electronic devices located in a same communication network, device parameters associated with the first service. Further, the first device may predict, according to the obtained device parameters, quality of service when each of the N electronic devices performs the first service. Subsequently, the first device may display a device list according to the quality of service of executing the first service by each electronic device in the N electronic devices, where the device list includes a device identifier of at least one electronic device in the N electronic devices, and therefore a specific device suitable for executing the first service is recommended to the user.

For example, the first service may be a service related to an audio function, such as an audio playing service or an audio recording service. Alternatively, the first service may be a service related to a display function, such as a video playing service, a video call service, or a game service. Alternatively, the first service may be a service related to a camera function, such as a video call service or a video recording service.

For example, the device parameters may include one or more of an audio parameter related to an audio function, a display parameter related to a display function, and a camera parameter related to a camera function.

That is, before executing a service as a master device, the first device may obtain related device parameters of a slave device (for example, the N electronic devices), so as to predict quality of service of each slave device when executing the service. In this way, the first device may recommend, to the user in a manner of displaying a device list, a specific device for executing the service based on the predicted quality of service when each slave device executes the service, thereby improving quality of service when a plurality of devices work cooperatively in a distributed scenario, and improving user experience.

In a possible implementation, the N electronic devices may include a second device. Device parameters obtained by the first device from the second device may include M (M is an integer greater than 0) parameters. In this case, that the first device predicts, according to the device parameters, quality of service of executing the first service by the second device includes: The first device determines M scores in a one-to-one correspondence with the M parameters; and further, the first device may calculate, according to the M scores, a quality of service score of executing the first service by the second device. When the quality of service score is higher, the quality of service of the first service is higher.

For example, the first device may score the M parameters of the second device one by one to obtain corresponding M scores. Further, the first device may weight and average the M scores according to a preset weight to obtain the quality of service score of executing the first service by the second device. Certainly, a quality of service score of executing the first service by another device in the N electronic devices may also be calculated according to the foregoing method, which is not limited in this application.

In a possible implementation, the N electronic devices may further include a third device. When the quality of service score of executing the first service by the second device is higher than a quality of service score of executing the first service by the third device, an arrangement sequence of the second device in the device list is located before the third device. That is, the first device may recommend, to the user by using an arrangement sequence between devices in the displayed device list, a device that executes a related service.

In a possible implementation, when the quality of service score of executing the first service by the second device is greater than a quality of service score of executing the first service by another electronic device in the N electronic devices, it indicates that the second device is a device that is most suitable for executing the first service in the N electronic devices, and the second device may be marked as a recommended device in the device list, thereby prompting the user to execute the first service by using the recommended device.

In a possible implementation, the M parameters may include a first parameter corresponding to a first function, for example, a display parameter corresponding to a display function. Therefore, when a score of a first parameter of the second device is higher than a score of a first parameter of another electronic device in the N electronic devices, it indicates that the quality of service of the second device is relatively high when the second device executes the first function of the first service, the first device may display first prompt information in the device list, and the first prompt information is used to recommend the user to implement the first function by using the second device. That is, the first device may recommend, to the user, a device that has a relatively prominent function when executing the first service.

In a possible implementation, the M parameters include a first parameter corresponding to a first function, for example, a display parameter corresponding to a display function. Therefore, when a score of a first parameter of the second device is less than a score of a first parameter of another electronic device in the N electronic devices, it indicates that the quality of service of the second device is relatively low when the second device executes the first function of the first service, the first device may display second prompt information in the device list, and the second prompt information includes a reason why the user is not recommended to implement the first function by using the second device. That is, the first device may remind the user of a specific reason why a specific device is not recommended to execute the first service.

In a possible implementation, the N electronic devices include a second device. After the first device displays the device list according to the quality of service of executing the first service by each of the N electronic devices, the method further includes: The first device receives a second operation of selecting the second device from the device list by the user; then, in response to the second operation, the first device may switch the first service to the second device for execution. In this way, the user may switch the first service to the second device based on the device recommended by the first device in the device list, so as to implement a distributed service scenario in which a plurality of devices work cooperatively.

In a possible implementation, after the first device switches the first service to the second device for execution, the method further includes: The first device may obtain again, from a current slave device (for example, N electronic devices located in a same communication network as a mobile phone), device parameters associated with the first service; and similarly, the first device may predict, according to the obtained device parameters, quality of service of executing the first service by each electronic device of the current N electronic devices. When the second device is not an electronic device with highest quality of service of executing the first service in the N electronic devices, it indicates that the first service is currently not suitable for execution on the second device, the first device may display a first prompt message, where the first prompt message is used to prompt the user to use the recommended device to execute the first service, and the recommended device is one or more of the N electronic devices.

That is, in a process in which the first device serves as the master device to execute a service in cooperation with another device (for example, the second device), related device parameters of each slave device may be obtained in real time, so as to predict quality of service of each slave device when executing the service. In this way, the first device may recommend, to the user by using a display prompt message, a recommended device for executing the service based on the predicted quality of service of each slave device when executing the service, so as to improve quality of service when a plurality of devices work cooperatively in a distributed scenario, and improve user experience.

In a possible implementation, that the first device predicts, according to the device parameters, quality of service of executing the first service by each electronic device in the N electronic devices includes: The first device may calculate, according to the device parameters obtained from each electronic device, the quality of service score of executing the first service by each electronic device. For example, the first device may score each parameter in the device parameters corresponding to each electronic device, and then performs weighted averaging on all scores to calculate a quality of service score of executing the first service by a corresponding electronic device.

In a possible implementation, the N electronic devices include a third device. When a quality of service score of executing the first service by the third device is higher than that of another electronic device in the N electronic devices, the recommended device is the third device; or when a quality of service score of executing a first subtask in the first service by the third device is higher than that of another electronic device in the N electronic devices, the recommended device is the third device. That is, when a device other than the second device in the N electronic devices executes the first service or a subtask in the first service has relatively high quality of service, the first device may determine the device as a recommended device, so as to recommend that the user uses the recommended device to execute the first service.

In a possible implementation, the first service may include a first subtask and a second subtask. For example, a screen projection service may include an audio play task and a display task. The N electronic devices may include a third device and a fourth device. When a quality of service score of executing the first subtask by the third device is higher than that of another electronic device in the N electronic devices, and a quality of service score of executing the second subtask by the fourth device is higher than that of another electronic device in the N electronic devices, the recommended device is a device group formed by the third device and the fourth device. That is, when a plurality of devices cooperatively execute the first service, relatively high quality of service may be obtained. The first device may recommend, to the user in a form of a device group, a plurality of devices to jointly execute the first service.

In a possible implementation, the method further includes: The first device predicts a quality of service score of executing the first service by the first device; and when the quality of service score of executing the first service by the first device is higher than those of the N electronic devices, the recommended device may be the first device. That is, a master device (that is, the first device) may also be used as a candidate device of the recommended device. When quality of service of the first device executing a target service (for example, the first service), the user may be prompted to execute the first service by using the first device.

In a possible implementation, the first prompt message may include a device identifier of the recommended device. After the first device displays the first prompt message, the method further includes: The first device receives a third operation of selecting a recommended device from the first prompt message by the user; and in response to the third operation, the first device switches the first service to the recommended device for execution. In this way, the user may quickly switch the first service to the recommended device with relatively high quality of service by using the device identifier of the recommended device in the first prompt message.

In a possible implementation, when the second device is not an electronic device with highest quality of service of executing the first service in the N electronic devices, the method further includes: The first device may notify the second device of the recommended device, so that the second device displays a second prompt message, where the second prompt message is used to prompt the user to execute the first service by using the recommended device. Similarly, the user may quickly switch the first service to the recommended device with relatively high quality of service by using the second prompt message in the second device.

In a possible implementation, the device parameters may include one or more of an audio parameter, a display parameter, a camera parameter, or a delay. The audio parameter may include one or more of a sound effect algorithm supported by the slave device, a quantity of sound channels, a sampling rate, a sound mixing policy, an audio data coding and decoding algorithm, a quantity and models of microphones, and a quantity and models of speakers. The display parameter may include one or more of a resolution supported by the slave device, a frame rate, a display data coding and decoding algorithm, or the like. The camera parameter may include one or more of an image processing algorithm supported by the slave device, a quantity of cameras, a camera resolution, or an FOV of the camera.

According to a second aspect, this application provides an electronic device (for example, the first device), including a communication module, a display screen, one or more processors, one or more memories, and one or more computer programs. The processor is coupled to the communication module, the display screen, and the memory. The one or more computer programs are stored in the memory. When the first device runs, the processor executes the one or more computer programs stored in the memory, so that the first device performs the device recommendation method in any one of the foregoing aspects.

According to a third aspect, this application provides a computer readable storage medium, including computer instructions. When the computer instructions run on the first device, the first device performs the device recommendation method in any one of the foregoing aspects.

According to a fourth aspect, this application provides a computer program product. When the computer program product runs on the first device, the first device performs the device recommendation method in any one of the foregoing aspects.

It may be understood that the electronic device, the computer readable storage medium, and the computer program product provided in the foregoing aspects are all applied to the foregoing corresponding method. Therefore, for beneficial effects that can be achieved by the electronic device, the computer readable storage medium, and the computer program product, references may be made to beneficial effects in the foregoing corresponding method. Details are not described herein again.

DESCRIPTION OF EMBODIMENTS

The following describes implementations in the embodiments in detail with reference to the accompanying drawings.

Figure 1:
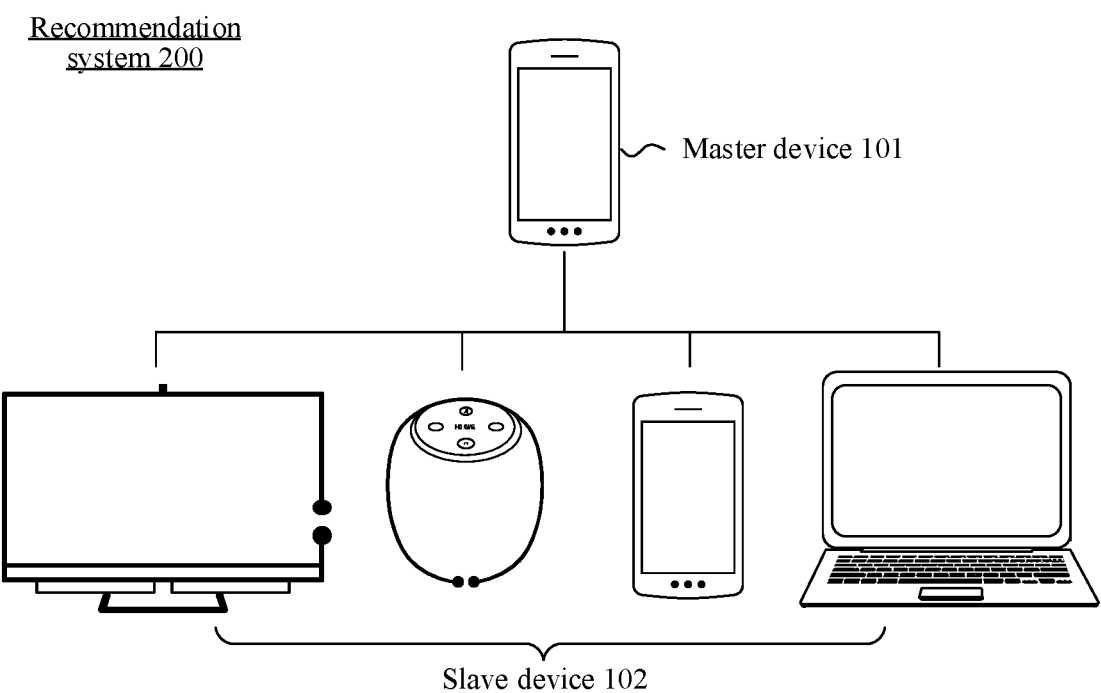
FIG. 1 is a schematic architecture diagram of a recommendation system according to an embodiment of this application.

An embodiment of this application provides a device recommendation method, which may be applied to a recommendation system 200 shown in FIG. 1. As shown in FIG. 1, the recommendation system 200 may include a master device (master) 101 and N slave devices (slave) 102, where N is an integer greater than 0. The master device 101 may communicate with any slave device 102 in a wired manner, or may communicate in a wireless manner.

For example, a wired connection may be established between the master device 101 and the slave device 102 by using a universal serial bus (universal serial bus, USB). In another example, the master device 101 and the slave device 102 may establish a wireless connection by using a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), Bluetooth, wireless fidelity (wireless fidelity, Wi-Fi), NFC, voice over Internet protocol (voice over Internet protocol, VoIP), and a communication protocol that supports a network slice architecture.

For example, the master device 101 (or the slave device 102) may be specifically an electronic device such as a mobile phone, a tablet computer, a television (which may also be referred to as a smart screen, a smart TV, or a large screen device), a notebook computer, a ultra-mobile personal computer (Ultra-mobile Personal Computer, UMPC), a handheld computer, a netbook, a personal digital assistant (Personal Digital Assistant, PDA), a wearable electronic device, an in-vehicle device, and a virtual reality device. This is not limited in this embodiment of this application.

In this embodiment of this application, the master device 101 may switch one or more services (for example, an audio playing service, an audio recording service, a video playing service, or a camera service) of the master device 101 to the slave device 102 for execution, so as to present a distributed scenario in which a plurality of devices work cooperatively. A service may correspond to one or more functions in an application. For example, a video APP may provide a video playing service for implementing a screen projection function. In another example, an audio APP may provide an audio playing service used to implement an audio play function, or may provide a karaoke service used to implement an audio recording function. In a distributed scenario, the master device 101 may switch a service to the slave device 102. In this case, the master device 101 may execute the service in cooperation with the slave device 102.

For example, the master device 101 may send audio data that is being played to the slave device 102, and the slave device 102 plays the audio data, so that an audio playing service of the master device 101 is switched to the slave device 102 for execution. In another example, the master device 101 may send display data in a video to one slave device 102 for playing, and send audio data in the video to another slave device 102 for playing, so that a video playing service of the master device 101 is switched to a plurality of slave devices 102 for execution. One service may include one or more subtasks. For example, the video playing service may include a display subtask related to a display function and an audio subtask related to an audio function.

In another example, the master device 102 may collect audio data by using a microphone of the slave device 102, and send the collected audio data to the master device 101 for saving or playing, so as to switch an audio recording service of the master device 101 to the slave device 102 for execution. In another example, the master device 102 may collect a photographed image by using a camera of the slave device 102, and send the photographed image to the master device 101 for display, so as to switch a camera service of the master device 101 to the slave device 102 for execution.

However, in the foregoing distributed scenario, when the master device 101 switches a service to the slave device 102, a quality of service problem such as poorer audio quality, poorer display quality, out-of-sync audio and video, or a long delay may occur due to a device performance difference or the like.

For this reason, in this embodiment of this application, the master device 101 may predict quality of service when a current service is switched to different slave devices 102 for execution. Further, the master device 101 may recommend, to the user according to a prediction result, one or more electronic devices that execute the foregoing service. In this way, the user may select a proper device to cooperate with the master device 101 to execute a corresponding service according to recommendation of the master device 101, so as to improve quality of service when the master device 101 works with the slave device 102 in the distributed scenario.

Figure 2:
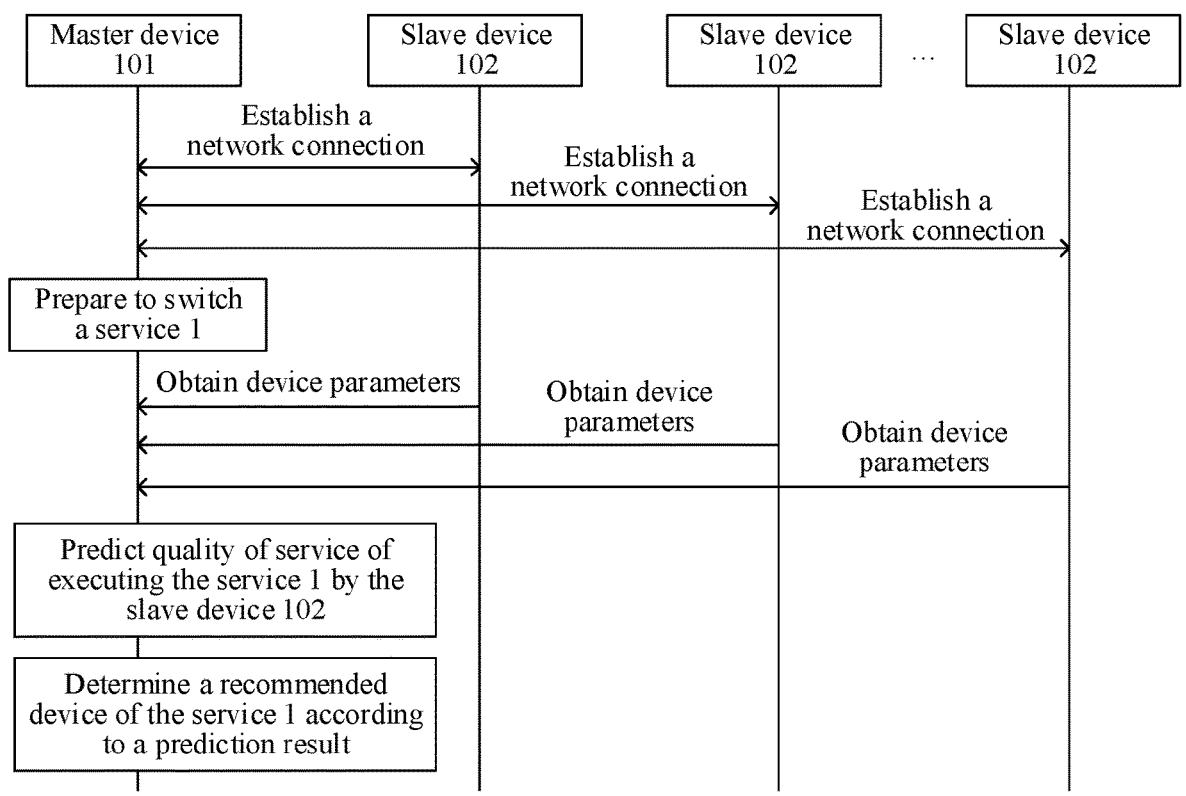
FIG. 2 is a schematic interaction diagram of a device recommendation method according to an embodiment of this application.

For example, as shown in FIG. 2, the master device 101 may establish a network connection to one or more slave devices 102. Further, when the master device 101 is ready to switch a service 1 to one or more slave devices 102 for execution, the master device 101 may obtain device parameters associated with the service 1 from each slave device 102.

For example, when the service 1 is a camera service, the device parameters associated with the service 1 may include an image processing algorithm supported by the slave device 102, a quantity of cameras, a camera resolution, or an FOV of the camera.

In another example, when the service 1 is an audio playing service, the device parameters associated with the service 1 may include a sound effect algorithm, a sound channel quantity, a sampling rate, a sound mixing policy, a model of a speaker, and the like that are supported by the slave device 102.

In another example, when the service 1 is an audio recording service, the device parameters associated with the service 1 may include a voice processing algorithm supported by the slave device 102, a coding and decoding algorithm of audio data, a quantity of microphones, and the like.

In another example, when the service 1 is a display service, the device parameters associated with the service 1 may include a resolution supported by the slave device 102, a frame rate, a coding and decoding algorithm of display data, and the like.

Still as shown in FIG. 2, after obtaining the device parameters associated with the service 1 from each slave device 102, the master device 101 may predict, according to the obtained device parameters, quality of service of executing the service 1 by each slave device 102. Further, the master device 101 may determine a corresponding recommended device according to the quality of service of executing the service 1 by each slave device 102. For example, the master device 101 may determine the slave device 102 that has highest quality of service when executing the service 1 as the recommended device. Alternatively, after switching the service 1 to the slave device 102 for execution, that is, in a process in which the master device 101 executes the service in cooperation with the slave device 102, the master device 101 may obtain device parameters associated with the service 1 from each slave device 102, and determine a corresponding recommended device according to the foregoing method.

After determining the corresponding recommended device, the master device 101 may recommend the determined recommended device to the user. For example, the master device 101 may display a prompt message, and the prompt message may carry an identifier of the recommended device. If it is detected that the user taps the identifier of the recommended device, the master device 101 may be triggered to re-switch the service 1 to the corresponding recommended device for execution.

In this way, the user may learn, in a timely manner by using the prompt message, a specific device suitable for executing the service 1 in a current distributed scenario. In addition, the user may quickly switch, by using the identifier in the foregoing prompt message, a specific device for executing the service 1, so as to improve quality of service when a plurality of devices work cooperatively in a distributed scenario, and improve user experience.

A specific process in which the master device 101 obtains the device parameters of each slave device 102 and determines a corresponding recommended device for recommendation to the user is described in detail in a subsequent embodiment. Therefore, details are not described herein.

Figure 3:
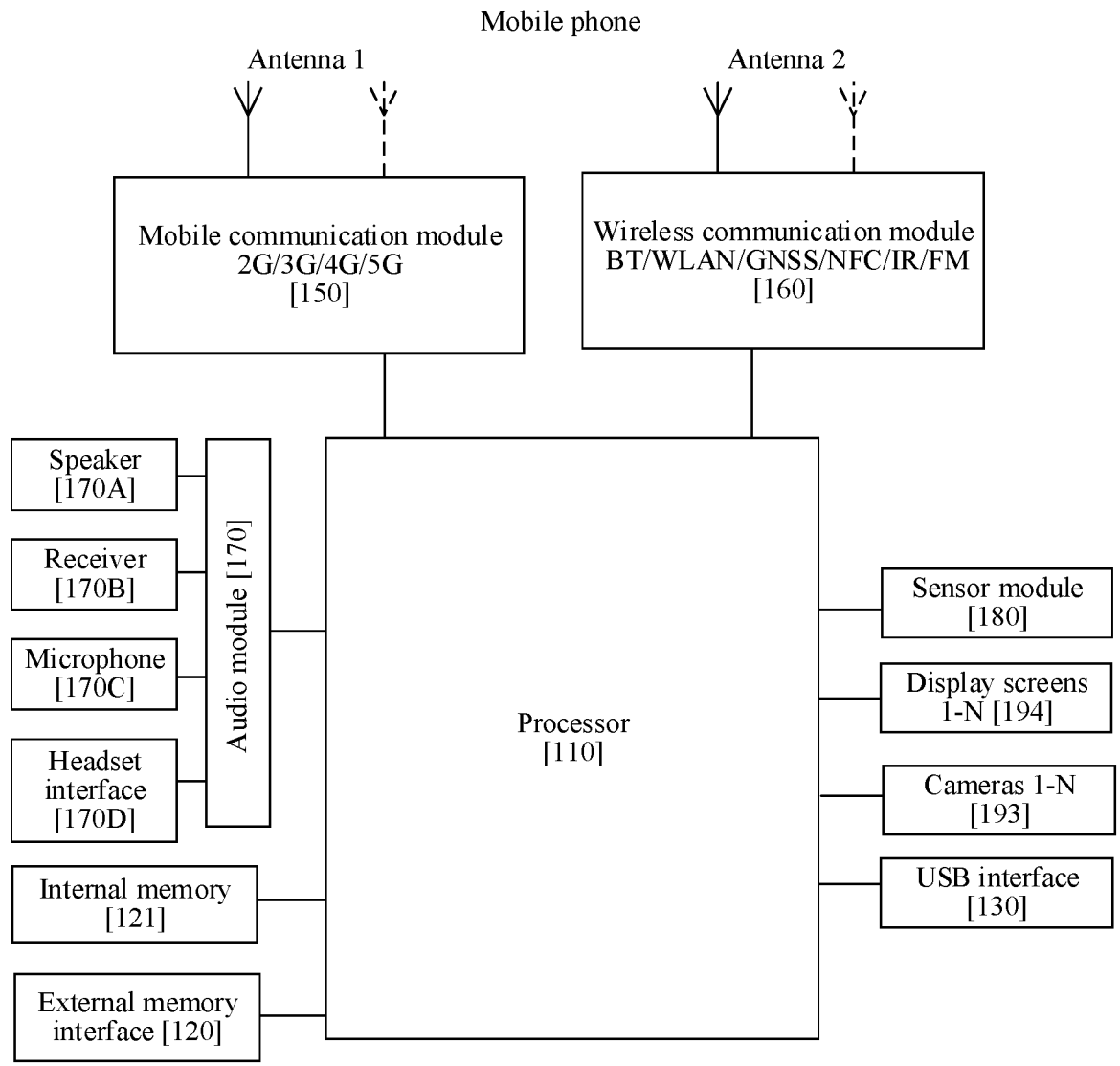
FIG. 3 is a schematic structural diagram 1 of an electronic device according to an embodiment of this application.

For example, using a mobile phone as the master device 101 in the screen recording system 200 as an example, FIG. 3 shows a schematic structural diagram of the mobile phone.

The mobile phone may include a processor 110, an external memory interface 120, an internal memory 121, a universal serial bus (universal serial bus, USB) interface 130, a mobile communication module 150, a wireless communication module 160, an audio module 170, a speaker 170A, a receiver 170B, a microphone 170C, a headset interface 170D, a sensor module 180, and the like.

It may be understood that the schematic structure in this embodiment of the present invention constitutes no specific limitation on the mobile phone. In some other embodiments of this application, the mobile phone may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The processor 110 may further be configured with a memory configured to store an instruction and data. In some embodiments, the memory in the processor 110 is a cache memory. The memory may store an instruction or data that is just used or used cyclically by the processor 110. If the processor 110 needs to use the instruction or the data again, the instruction or the data may be directly invoked from the memory. Repeated access is avoided, and waiting time of the processor 110 is reduced, thereby improving system efficiency.

A wireless communication function of the mobile phone may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal.

The mobile communication module 150 can provide a solution for wireless communication including 2G/3G/4G/5G and the like to be applied to the mobile phone. In some embodiments, at least some of functional modules of the mobile communication module 150 may be disposed in the processor 110. In some embodiments, at least some of the functional modules of the mobile communication module 150 may be disposed in a same device as at least some of modules of the processor 110.

The wireless communication module 160 can provide a solution for wireless communication including a wireless local area network (wireless local area networks, WLAN) (such as a wireless fidelity (wireless fidelity, Wi-Fi) network), Bluetooth (bluetooth, BT), a global navigation satellite system (global navigation satellite system, GNSS), frequency modulation (frequency modulation, FM), a near field communication technology (near field communication, NFC), an infrared technology (infrared, IR) and the like to be applied to the mobile phone.

In some embodiments, in the mobile phone, the antenna 1 is coupled to the mobile communication module 150, and the antenna 2 is coupled to the wireless communication module 160, so that the mobile phone can communicate with a network and another device by using a wireless communication technology.

The mobile phone implements a display function by using the GPU, the display screen 194, the application processor, and the like. The GPU is a microprocessor for image processing, and is connected to the display screen 194 and the AP. The GPU is configured to perform mathematical and geometric calculation, and is configured to render graphics. The processor 110 may include one or more GPUs, and execute program instructions to generate or change display information.

The display screen 194 is configured to display an image, a video, and the like. The display screen 194 includes a display panel. The display panel may use a liquid crystal display screen (liquid crystal display, LCD), an organic light-emitting diode (organic light-emitting diode, OLED), a passive matrix/organic light emitting diode or an active matrix/organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the mobile phone may include one or N display screens 194, where N is a positive integer greater than 1.

The mobile phone can implement a photographing function by using the ISP, the camera 193, the video codec, the GPU, the display screen 194, the application processor, and the like.

The camera 193 is configured to capture a still image or a video. An object generates an optical image by using a lens and projects the optical image to a photosensitive element. The photosensitive element may be a charge-coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert it to a digital image signal. The ISP outputs the digital image signal to the DSP for processing. The DSP converts the digital image signal into a standard image signal in a format such as RGB or YUV. In some embodiments, the mobile phone may include one or N cameras 193, where N is a positive integer greater than 1.

The external memory interface 120 may be configured to connect to an external storage card such as a micro SD card, to extend a storage capability of the mobile phone. The external storage card communicates with the processor 110 by using the external memory interface 120, to implement a data storage function, for example, storing a file such as a music or a video in the external storage card.

The internal memory 121 may be configured to store computer executable program code, and the executable program code includes instructions. The processor 110 runs the instruction stored in the internal memory 121, to perform various function applications and data processing of the mobile phone. The mobile phone can implement an audio function, for example, music playback and recording, by using the audio module 170, the speaker 170A, the phone receiver 170B, the microphone 170C, the headset interface 170D, the application processor, and the like, for example, music playing and audio recording.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "horn", is configured to convert an audio electrical signal into a sound signal. Music can be listened to or a hands-free call can be answered by using the speaker 170A in the mobile phone.

The receiver 170B, also referred to as a "handset", is configured to convert an audio electrical signal into a sound signal. When a call is answered or audio information is listened to by using the mobile phone, the phone receiver 170B may be put close to a human ear to listen to a voice.

The microphone 170C, also referred to as a "mic" and a "mike", is configured to convert a sound signal into an electrical signal. When making a call or sending a voice message, a user can make a sound near the microphone 170C through the mouth of the user to input a sound signal to the microphone 170C. At least one microphone 170C may be disposed in the mobile phone. In some other embodiments, two microphones 170C may be disposed in the mobile phone, to collect a sound signal and further implement a noise reduction function. In some other embodiments, alternatively, three, four, or more microphones 170C may be disposed in the mobile phone, to collect a sound signal, reduce noise, and further identify a sound source, implement a directional recording function, and the like.

The headset interface 170D is configured to connect to a wired headset. The headset interface 170D may be a USB interface 130, or may be a 3.5-mm open mobile electronic device platform (open mobile terminal platform, OMTP) standard interface or a cellular telecommunications industry association of the USA (cellular telecommunications industry association of the USA, CTIA) standard interface.

The sensor module 180 may include sensors, for example, a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

Certainly, the mobile phone may further include a charging management module, a power management module, a battery, a key, an indicator, one or more SIM card interfaces, and the like. This is not limited in this embodiment of this application.

A software system of the mobile phone may use a layered architecture, an event driven architecture, a micro core architecture, a micro service architecture, or a cloud architecture. In this embodiment of this application, an Android system of a layered architecture is used as an example to illustrate a software structure of the mobile phone. Certainly, in another operating system, a function implemented by each function module is similar to this embodiment of this application.

Figure 4:
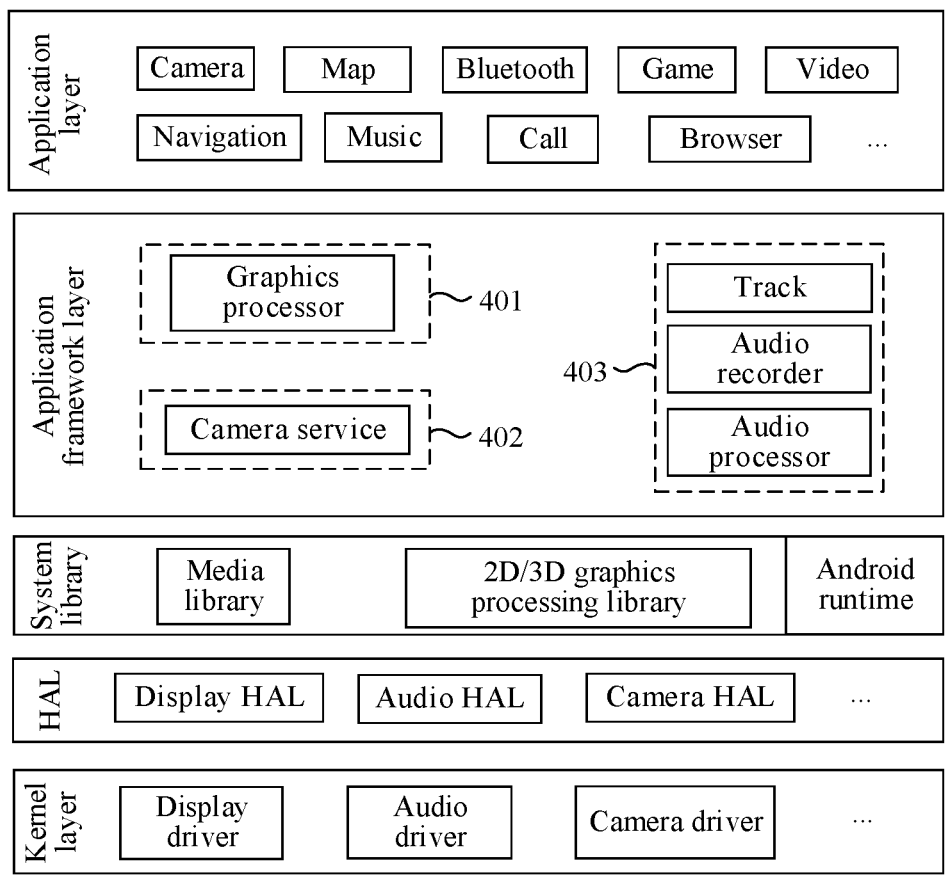
FIG. 4 is a schematic architecture diagram 1 of an operating system of an electronic device according to an embodiment of this application.

FIG. 4 is a block diagram of the software structure of the mobile phone in this embodiment of this application.

In the layered architecture, software is divided into several layers, and each layer has a clear role and task. The layers communicate with each other by using a software interface. In some embodiments, an Android system is divided into five layers: an application layer, an application framework layer (framework), an Android runtime (Android runtime), a system library (libraries), an HAL (hardware abstraction layer, hardware abstraction layer), and a kernel layer (kernel).

The application layer may include a series of application packages.

As shown in FIG. 4, an APP (application, application) such as call, memo, browser, contacts, camera, gallery, calendar, map, Bluetooth, music, video, and SMS message may be installed at the application layer.

The application framework layer provides an application programming interface (application programming interface, API) and a programming framework for an application at the application layer. The application framework layer includes some predefined functions.

As shown in FIG. 4, functional modules such as a display module 401, a camera module 402, and an audio module 403 are disposed at the application framework layer.

For example, the display module 401 may include an image processor (SurfaceFlinger). The APP at the application layer may invoke SurfaceFlinger to draw a corresponding display interface to implement a display function.

For example, the camera module 402 may include a camera service (CameraService). The APP at the application layer may invoke CameraService to start the camera to perform an operation such as preview, photographing, or video recording, so as to implement a corresponding camera function.

For example, the audio module 403 may include an audio recorder (AudioRecord), an audio track (AudioTrack), and an audio processor (AudioFlinger). The APP at the application layer may invoke AudioTrack to enable an audio play function. AudioTrack may send received audio data to AudioFlinger for processing such as sound mixing and sampling, and AudioFlinger sends the processed audio data to a component such as the speaker for playing. Similarly, the APP at the application layer may invoke AudioRecord to enable a recording function. AudioFlinger may perform processing such as sound mixing and sampling on audio data recorded by a component such as the microphone, and further, AudioFlinger may send the processed audio data to AudioRecord for recording.

Still as shown in FIG. 4, the HAL of the mobile phone provides HALs corresponding to different hardware modules of the mobile phone, for example, an audio (Audio) HAL, a camera (Camera) HAL, a display (Display) HAL, a Wi-Fi HAL (not shown in FIG. 4), and the like. The Audio HAL may be corresponding to an audio input device or an audio output device of the mobile phone, the camera HAL may be corresponding to the camera of the mobile phone, and the display HAL may be corresponding to a display output device of the mobile phone.

For example, the display module 401 (for example, SurfaceFlinger) may invoke the display HAL, send display data to the display HAL, and the display HAL sends the display data to a corresponding display device (for example, the display screen) for playing.

In another example, the camera module 402 (for example, CameraService) may invoke the camera HAL, and the camera HAL reports, to CameraService, a photographed picture collected by a component such as the camera. CameraService may send the obtained photographed picture to a corresponding APP for displaying or storage.

Similarly, the audio module 403 (for example, AudioFlinger) may invoke the audio HAL, send the audio data to the audio HAL, and the audio HAL sends the audio data to a corresponding audio output device (for example, the speaker or the headset) for playing. Alternatively, AudioFlinger may invoke the audio HAL, and the audio HAL reports audio data recorded by an audio input device (for example, the microphone) to AudioFlinger. AudioFlinger may send the obtained audio data to a corresponding APP.

In addition, the application framework layer may further include a window manager, a content provider, a view system, a resource manager, a notification manager, and the like. This is not limited in this embodiment of this application.

For example, the window manager is configured to manage a window program. The window manager may obtain a size of the display screen, determine whether there is a status bar, lock the screen, take a screenshot, and the like. The content provider is configured to store and obtain data and make the data accessible to an application. The data may include a video, an image, an audio, calls that are made and received, a browsing history and bookmarks, an address book, and the like. The view system may be configured to construct a display interface of an application. Each display interface may be composed of one or more controls. Generally, the control may include interface elements such as icon, button, menu, tab, text box, dialog box, status bar, navigation bar, and widget (Widget). The resource manager provides various resources such as a localized character string, an icon, an image, a layout file, and a video file for an application. The notification manager enables an application to display notification information in the status bar that may be used to convey a message of a notification type, where the message may disappear automatically after a short stay without user interaction. For example, the notification manager is configured to notify a user of download completion or remind a user of a message. The notification manager may alternatively display a notification in a form of a chart or a scroll bar text in a status bar at the top of the system, for example, a notification of an application run in the background, or may display a notification in a form of a dialog window on the screen. For example, text information is prompted for in the status bar, an announcement is produced, the mobile phone vibrates, or the indicator light blinks.

The Android runtime includes a core library and a virtual machine. The Android runtime is responsible for scheduling and management of the Android system.

The core library includes two parts: one is a function that needs to be called by a java language, and the other is a core library of Android.

The application layer and the application framework layer are run in the virtual machine. The virtual machine executes java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications. The media library supports playback and recording in a plurality of commonly used audio and video formats, and static image files. The media library may support a plurality of audio and video encoding formats, for example, MPEG 4, H.264, MP3, AAC, AMR, JPG, and PNG. The three-dimensional graphics processing library is configured to implement drawing of three-dimensional graphics, image rendering, synthesis, layer processing, and the like. The 2D graphics engine is a drawing engine for 2D graphics.

The kernel layer is located below the HAL, and is a layer between hardware and software. In addition to the foregoing ultrasonic driver, the kernel layer may further include a display driver, a camera driver, an audio driver, a sensor driver, and the like. This is not limited in this embodiment of this application.

Figure 5:
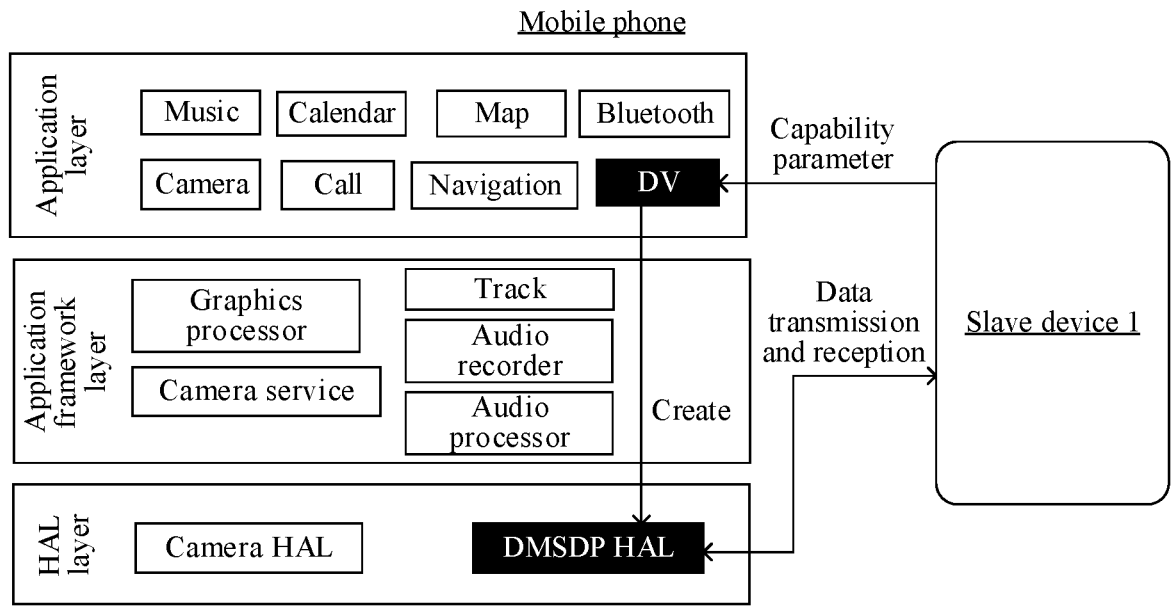
FIG. 5 is a schematic architectural diagram 2 of an operating system of an electronic device according to an embodiment of this application.

Based on the software architecture of the Android system shown in FIG. 4, in this embodiment of this application, as shown in FIG. 5, a device virtualization (DeviceVirtualization) APP used to implement services in a distributed scenario may be installed at the application layer of the mobile phone, which may be subsequently referred to as a DV APP. The DV APP may run as a system application resident in the mobile phone. Alternatively, a function implemented by the DV APP may also be resident in the mobile phone in a form of a system service.

When the mobile phone needs to cooperate with one or more electronic devices to implement a service, the DV APP in the mobile phone may establish a network connection to the mobile phone by using the one or more electronic devices as slave devices of the mobile phone. Taking the slave device 1 as an example, as shown in FIG. 5, after the DV APP of the mobile phone establishes a network connection to the slave device 1, the DV APP may obtain a related capability parameter of the slave device based on the network connection. For example, the capability parameter may be used to reflect one or more of a display capability, an audio capability, and a photographing capability of the slave device 1. Further, the DV APP may invoke the preset interface in the HAL to input the obtained capability parameter to the preset interface, so as to create, at the HAL, an HAL corresponding to the slave device 1.

In this embodiment of this application, the HAL created by the DV APP according to the capability parameter of the slave device 1 may be referred to as a DMSDP (Distributed Mobile Sensing Development Platform, distributed mobile sensing development platform) HAL 1. Different from a conventional HAL (for example, the audio HAL, camera HAL, and display HAL in FIG. 4) in the mobile phone, the DMSDP HAL 1 is not corresponding to an actual hardware device of the mobile phone, but is corresponding to a slave device 1 currently connected to the mobile phone. The mobile phone may be used as a master device to send and receive data to and from the slave device 1 by using the DMSDP HAL 1, and the slave device 1 is used as a virtual device of the mobile phone to cooperate with the slave device 1 to complete services in the distributed scenario.

Similarly, when there are a plurality of slave devices in the mobile phone, the DV APP may further obtain a capability parameter of another slave device according to the foregoing method, and create a corresponding DMSDP HAL at the HAL according to the obtained capability parameter, so as to perform data receiving and sending with each slave device.

For a specific process in which the master device (for example, the mobile phone) obtains the capability parameter of the slave device, creates the DMSDP HAL, and performs data receiving and sending with the slave device according to the capability parameter of the slave device, refer to related descriptions of the application file with application number CN202010628962.7. Therefore, details are not described herein.

Figure 6:
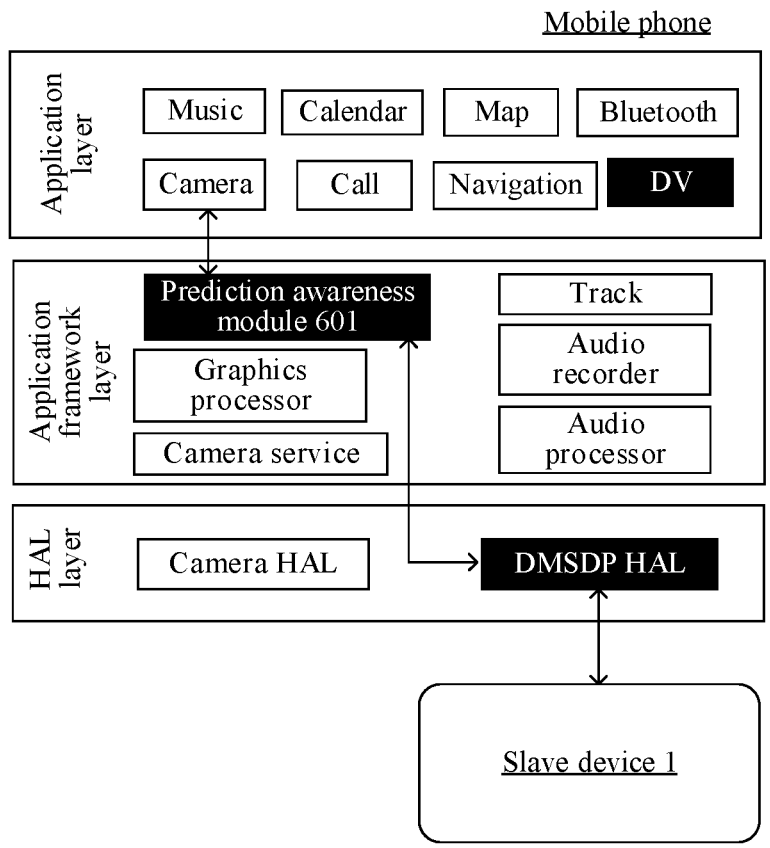
FIG. 6 is a schematic architecture diagram 3 of an operating system of an electronic device according to an embodiment of this application.

In this embodiment of this application, based on the software architecture shown in FIG. 5, as shown in FIG. 6, a prediction awareness module 601 may be disposed at the application framework layer. After a network connection is established between the mobile phone and one or more slave devices, the prediction awareness module 601 may detect a currently running service in real time, for example, an audio playing service, a video call service, a live streaming service, or an audio recording service.

Further, the prediction awareness module 601 may obtain, from each slave device according to the currently running service, device parameters corresponding to the service. For example, the device parameters may include one or more parameters such as an audio parameter, a display parameter, or a camera parameter.

The audio parameter may include one or more of a sound effect algorithm supported by the slave device, a quantity of sound channels, a sampling rate, a sound mixing policy, an audio data coding and decoding algorithm, a quantity and models of microphones, and a quantity and models of speakers. The audio parameter may reflect the audio capability of the slave device (for example, an audio playing capability or an audio recording capability).

The display parameter may include one or more of a resolution supported by the slave device, a frame rate, a display data coding and decoding algorithm, or the like. The display parameter may reflect the display capability of the slave device.

The camera parameter may include one or more of an image processing algorithm supported by the slave device, a quantity of cameras, a camera resolution, an FOV (field of view, field of view), or the like. The camera parameter may reflect a photographing capability of the slave device.

For example, after determining the device parameters corresponding to the current service, the prediction awareness module 601 of the mobile phone may obtain the device parameters from the corresponding slave device by using the corresponding DMSDP HAL. For example, still as shown in FIG. 6, the prediction awareness module 601 may send an obtaining request to the slave device 1 by using the DMSDP HAL 1, and the slave device 1 may send device parameters of the slave device 1 to the DMSDP HAL 1 of the mobile phone, and then the DMSDP HAL 1 sends the device parameters of the slave device 1 to the prediction awareness module 601. In this way, according to the foregoing method, the prediction awareness module 601 may obtain device parameters corresponding to a current service from each slave device.

Subsequently, the prediction awareness module 601 may predict, according to the obtained device parameters, quality of service of each slave device when executing the foregoing service. For example, the prediction awareness module 601 may score, according to device parameters of each slave device, quality of service of the slave device when executing the foregoing service. Further, the prediction awareness module 601 may recommend one or more slave devices with a relatively high score to the user as a recommended device. For example, the prediction awareness module 601 may report the determined recommended device to an APP (for example, a camera APP) running the current service, and the APP carries the recommended device in a prompt message, and displays the prompt message on a display interface.

In this way, the user may learn of the recommended device suitable for executing the foregoing service in the current distributed scenario, so as to switch the current service to the recommended device determined by the prediction awareness module 601 for execution, so as to improve quality of service when a plurality of devices work cooperatively in the distributed scenario, and improve user experience.

With reference to a specific scenario and an example, the following describes in detail a method in which the mobile phone recommends, in a distributed scenario, a recommended device for executing different services to the user.

Figure 7:
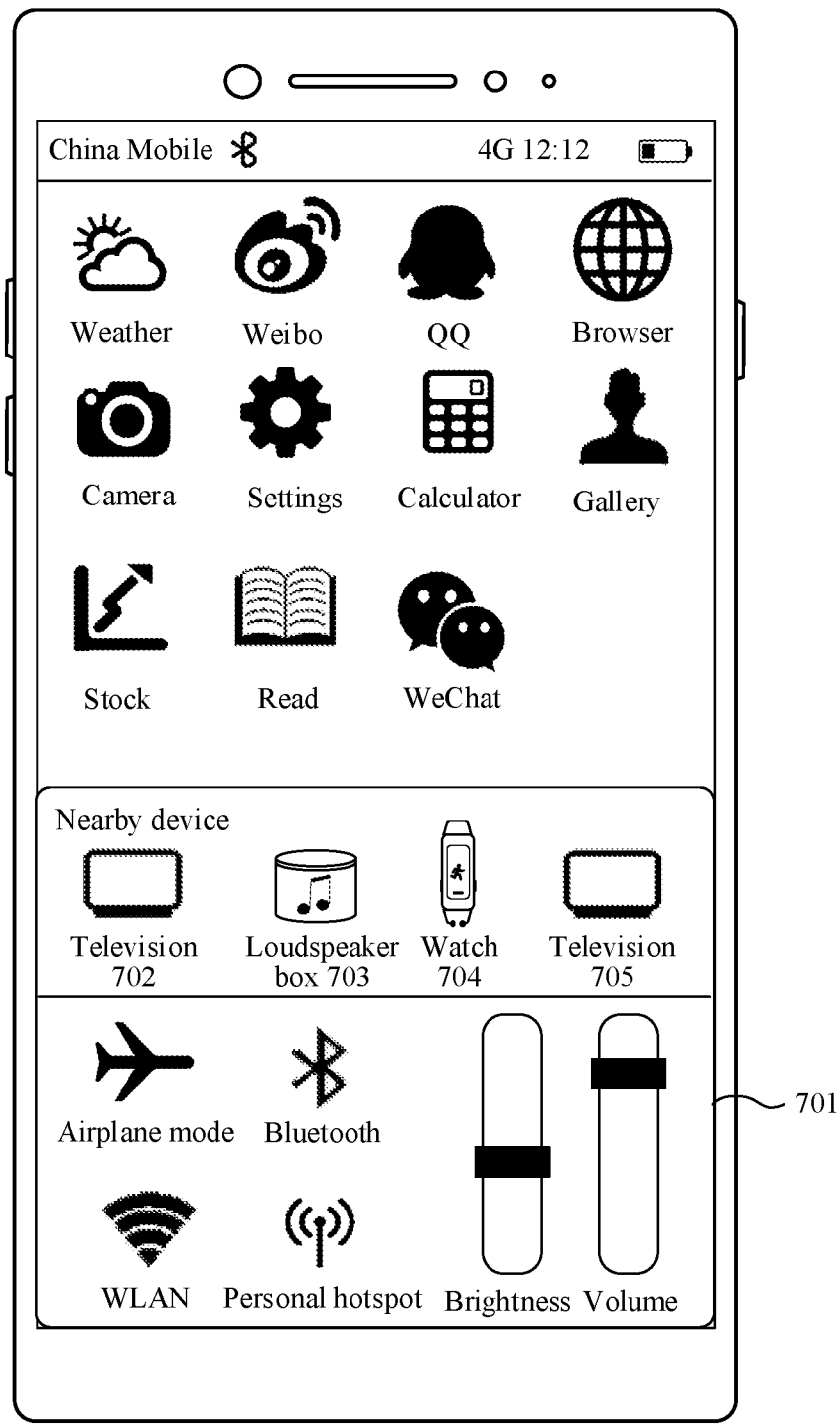
FIG. 7 is a schematic diagram 1 of an application scenario of an electronic device according to an embodiment of this application.

For example, the user may select one or more electronic devices in the mobile phone as a slave device of the mobile phone. For example, after detecting that the user enables a control center, the mobile phone may detect an electronic device that currently accesses a same communication network as the mobile phone. For example, the mobile phone may search for one or more electronic devices located in a same Wi-Fi network as the mobile phone. In another example, the mobile phone may query, on a server, one or more electronic devices that log in to a same account (for example, a Huawei account) as the mobile phone. Further, as shown in FIG. 7, the mobile phone may display one or more detected electronic devices in a control center 701. In this case, the user may select one or more electronic devices from the control center 701 as a slave device of the mobile phone.

Figure 8:
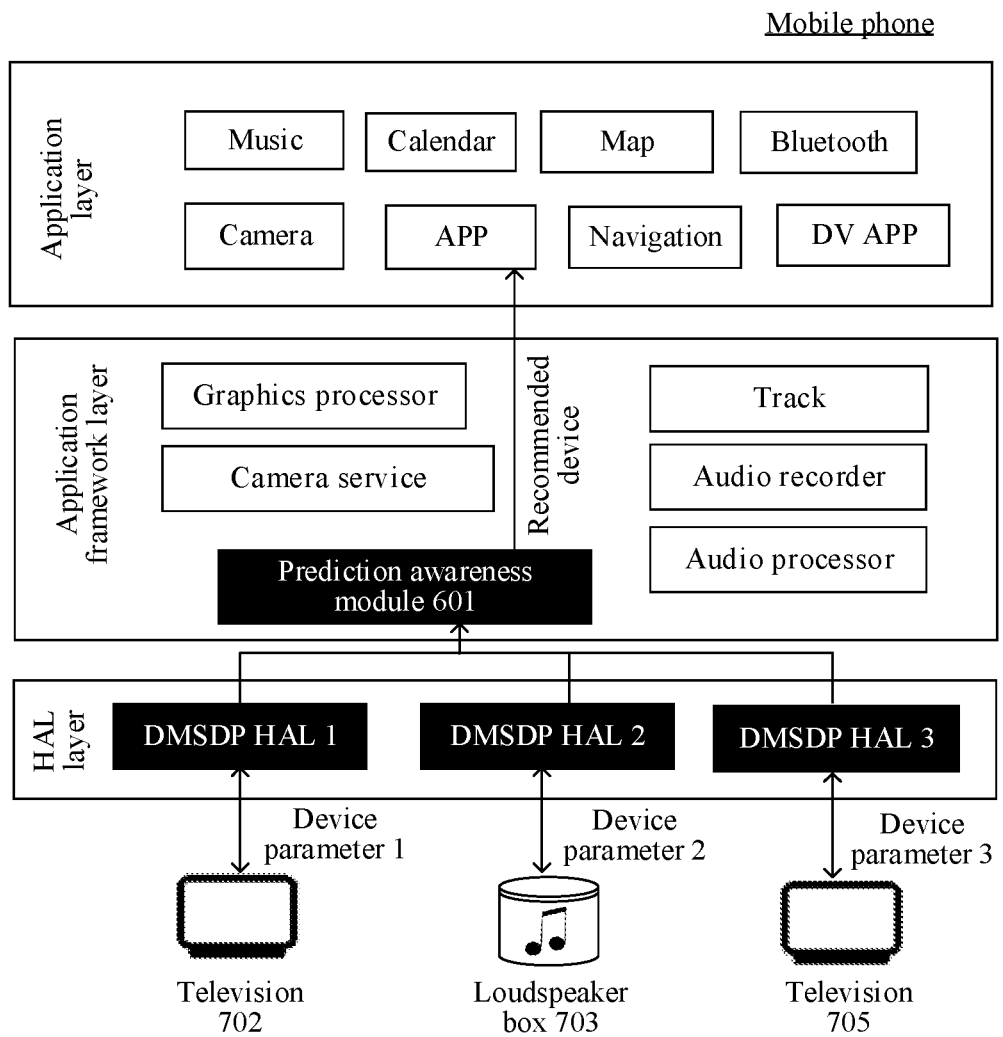
FIG. 8 is a schematic architecture diagram 4 of an operating system of an electronic device according to an embodiment of this application.

Still as shown in FIG. 7, the control center 701 displays a television 702, a loudspeaker box 703, a watch 704, and a television 705 that are detected by the mobile phone. If it is detected that the user taps the television 702, a DV APP of the mobile phone may establish a network connection to the television 702 by considering the television 702 as a slave device. Further, as shown in FIG. 8, the DV APP of the mobile phone may obtain a capability parameter of the television 702 from the television 702 based on the network connection, for example, a photographing capability parameter, an audio capability parameter, and a display capability parameter of the television 702. Subsequently, the DV APP of the mobile phone may create a corresponding DMSDP HAL 1 at the HAL according to the capability parameter of the television 702, so that the mobile phone may interact with the television 702 by using the DMSDP HAL 1.

Similarly, if it is further detected that the user taps the loudspeaker box 703, still as shown in FIG. 8, the mobile phone may obtain a capability parameter of the loudspeaker box 703 according to the foregoing method, and create a corresponding DMSDP HAL 2 at the HAL according to the capability parameter of the loudspeaker box 703. If it is further detected that the user taps the television 705, the mobile phone may obtain a capability parameter of the television 705 according to the foregoing method, and create a corresponding DMSDP HAL 3 at the HAL according to the capability parameter of the television 705. In this way, the mobile phone may be used as a master device to interact with three slave devices: the television 702, the loudspeaker box 703, and the television 705 by using corresponding DMSDP HALs, so as to implement various services in the distributed scenario.

A service performed by the mobile phone or the slave device generally involves one or more of an audio function, a display function, or a camera function. For example, a service related to the audio function may include a service such as audio playing, audio recording, karaoke, game, voice call, or video call. For example, a service related to the display function may include a service such as video playing, video call, and game. In another example, a service related to the camera function may include a service such as photographing, video recording, live streaming, code scanning, or video call.

In this embodiment of this application, after the mobile phone establishes a network connection to the foregoing slave device (for example, the television 702, the loudspeaker box 703, and the television 705), the prediction awareness module 601 in the mobile phone may detect, in real time, a specific service that is being executed by the mobile phone in the distributed scenario (which may be referred to as a target service in a subsequent embodiment).

For example, the prediction awareness module 601 may obtain an identifier of an application that is running on the mobile phone (for example, a package name of the application), and further determine, according to the identifier of the application, a target service that is being executed. For example, if the running application is a video APP, the prediction awareness module 601 may determine that the target service is a video playing service.

Alternatively, the prediction awareness module 601 may further obtain a usage status of each component in the mobile phone, and determine, with reference to the usage status of the component, a target service that is being executed. For example, when the mobile phone is running the WeChat APP, if a front-facing camera of the mobile phone is in a working state, the prediction awareness module 601 may determine that the target service is a video call service. Correspondingly, if a rear-facing camera of the mobile phone is in a working state, the prediction awareness module 601 may determine that the target service is a code scanning service.

Different services may have different device parameters that affect quality of service during running. For example, for an audio playing service, a quantity of speakers of a device, a sound effect algorithm, and a sound mixing policy have great impact on quality of service. In another example, for a live streaming service, a display resolution of a device, a model of a camera, an image processing algorithm, and a delay have great impact on quality of service.

Then, as shown in Table 1, a correspondence between different services and associated device parameters may be pre-stored in the mobile phone. After determining the current target service, the prediction awareness module 601 of the mobile phone may determine specific device parameters associated with the target service according to the correspondence shown in Table 1. Further, still as shown in FIG. 8, the prediction awareness module 601 of the mobile phone may obtain the device parameters associated with the target service from each slave device by using a corresponding DMSDP HAL.

TABLE 1

| Service | Device parameters |
| --- | --- |
| Service A | Device parameter A and device parameter B |
| Service B | Device parameter A, device parameter B, and device parameter C |
| ... | ... |

Figure 9:
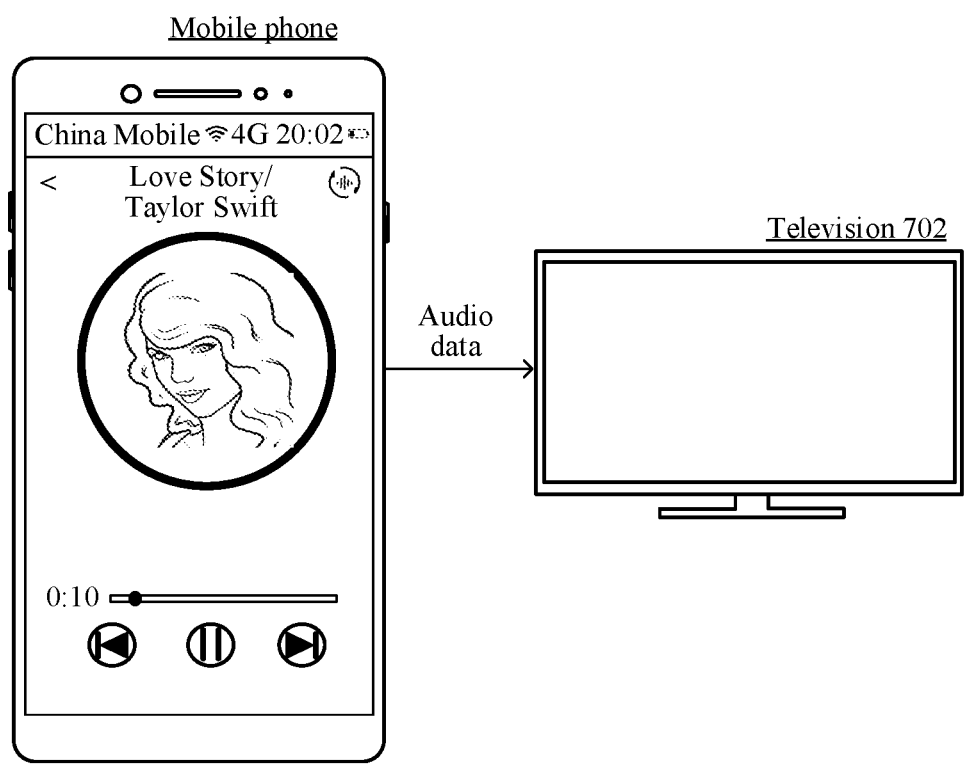
FIG. 9 is a schematic diagram 2 of an application scenario of an electronic device according to an embodiment of this application.

For example, the target service is an audio playing service. As shown in FIG. 9, when the mobile phone runs a music APP to play a song A, the user may switch the song A to the television 702 by using an audio switching function. After the prediction awareness module 601 of the mobile phone identifies that the current target service is an audio playing service, device parameters related to the audio playing service may be determined according to the correspondence shown in Table 1 and include three audio parameters: a quantity of speakers, a sound effect algorithm, and a sound mixing policy. Further, the prediction awareness module 601 of the mobile phone may obtain a device parameter 1 of the television 702 from the television 702 by invoking the DMSDP HAL 1, where the device parameter 1 includes a quantity of speakers, a sound effect algorithm, and a sound mixing policy of the television 702. In addition, the prediction awareness module 601 of the mobile phone may obtain a device parameter 2 of the loudspeaker box 703 from the loudspeaker box 703 by invoking the DMSDP HAL 2, where the device parameter 2 includes a quantity of speakers, a sound effect algorithm, and a sound mixing policy of the loudspeaker box 703. Similarly, the prediction awareness module 601 of the mobile phone may obtain a device parameter 3 of the television 705 from the television 705 by invoking the DMSDP HAL 3, where the device parameter 3 includes a quantity of speakers, a sound effect algorithm, and a sound mixing policy of the television 705.

Further, the prediction awareness module 601 of the mobile phone may predict, according to the obtained device parameter 1, the device parameter 2, and the device parameter 3, quality of service of each slave device when executing the audio playing service. For example, quality parameters corresponding to device parameters in different services may be pre-stored in the mobile phone. For example, as shown in Table 2, for different services, quality parameters of each device parameter associated with the service are preset, and each quality parameter may reflect a requirement of a corresponding service on the device parameter. For example, in an audio playing service, two or more quality parameters corresponding to a quantity of speakers may be set, which indicates that two or more speakers can meet a service requirement of the audio playing service. In another example, in a live streaming service, a quality parameter corresponding to a delay may be set to be within 500 ms, which indicates that a delay within 500 ms may meet a service requirement of the live streaming service.

TABLE 2

| Service | Quality parameter |
|---|---|
| Audio playing service | Quantity of speakers: 2 or more<br>Sound effect algorithm: Dolby sound effect or super bass sound effect<br>Sound mixing policy: policy 1 and policy 2 |
| Live streaming service | Display resolution: resolution A-resolution B<br>Model of the camera: model A and model B<br>Image processing algorithm: algorithm 1, algorithm 2, and algorithm 3<br>Delay: within 500 ms |
| ... | ... |

Therefore, after obtaining the device parameter 1 from the television 702, the prediction awareness module 601 of the mobile phone may predict, with reference to the quality parameters corresponding to the audio playing service in Table 2, a quality of service score 1 of the television 702 when executing the audio playing service by using the device parameter 1.

For example, the prediction awareness module 601 may score each device parameter in the device parameter 1 with reference to the quality parameters corresponding to the audio playing service in Table 2, that is, determine a quality of service score of each device parameter. For example, if the quantity of speakers in the device parameter 1 is 0, a score F1 of the device parameter of the quantity of speakers is 0. If the quantity of speakers in the device parameter 1 is 2, the score F1 of the device parameter of the quantity of speakers is 60. If the quantity of speakers in the device parameter 1 is 4, the score F1 of the device parameter of the quantity of speakers is 80.

According to the foregoing scoring method, the prediction awareness module 601 may obtain the score F1 of the quantity of speakers in the device parameter 1, a score F2 of a sound effect algorithm in the device parameter 1, and a score F3 of a sound mixing policy in the device parameter 1. Further, the prediction awareness module 601 may calculate, according to the score F1, the score F2, and the score F3, the quality of service score 1 of the television 702 when executing the audio playing service by using the device parameter 1. For example, the prediction awareness module 601 may calculate a weighted average value of the score F1, the score F2, and the score F3 according to a preset weight, and use the calculated weighted average value as the quality of service score 1.

Similarly, after obtaining the device parameter 2 from the loudspeaker box 703, the prediction awareness module 601 may predict, according to the foregoing method, the quality of service score 2 of the loudspeaker box 703 when executing the audio playing service by using the device parameter 2. In addition, after obtaining the device parameter 3 from the television 705, the prediction awareness module 601 may predict, according to the foregoing method, the quality of service score 3 of the television 705 when executing the audio playing service by using the device parameter 3.

Figure 10:
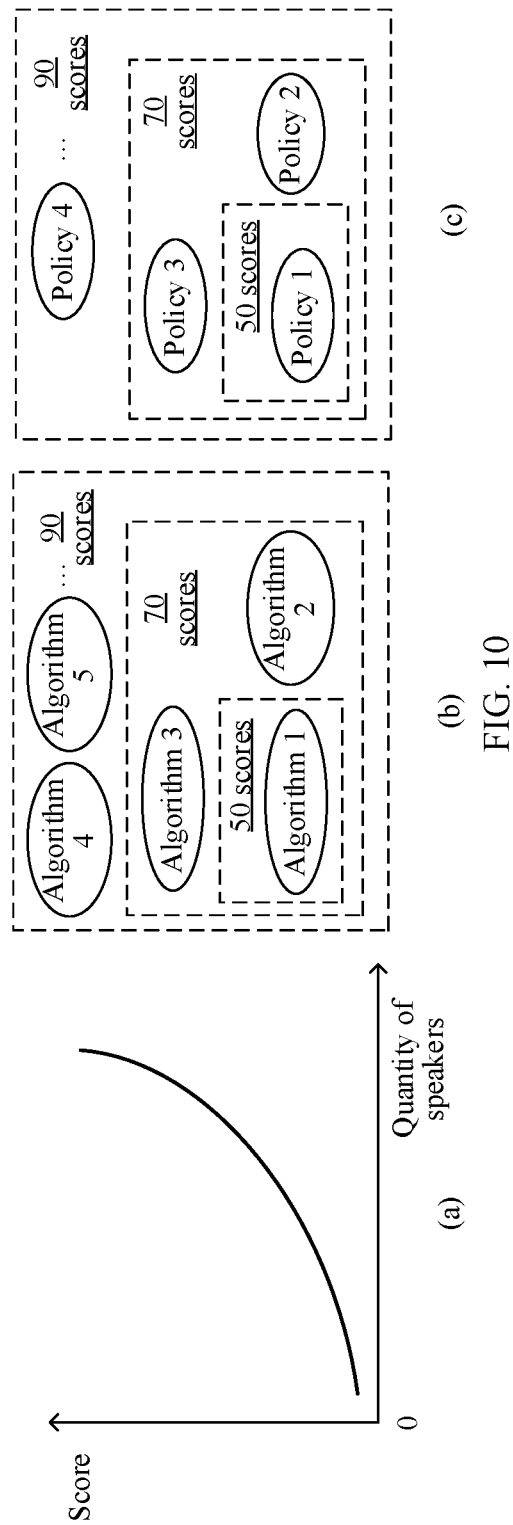
FIG. 10 is a schematic diagram 3 of an application scenario of an electronic device according to an embodiment of this application.

In some other embodiments, a quality parameter scoring curve or scoring rule corresponding to each device parameter in different services may also be pre-stored in the mobile phone. The audio playing service is still used as an example. As shown in (a) in FIG. 10, in the audio playing service, a correspondence between different quantities of speakers and quality parameter scores is a curve 1. The prediction awareness module 601 may determine, according to the curve 1, a score F1 of a device parameter that is corresponding to a quantity of speakers in the device parameter 1. (b) in FIG. 10 is a scoring rule 1 between different sound effect algorithms and quality parameter scores in the audio playing service. The prediction awareness module 601 may determine, according to the scoring rule 1, a score F2 of a device parameter corresponding to the sound effect algorithm in the device parameter 1. Similarly, (c) in FIG. 10 is a scoring rule 2 between different sound mixing policies and quality parameter scores in the audio playing service. The prediction awareness module 601 may determine, according to the scoring rule 2, a score F3 of a device parameter such as a sound mixing policy in the device parameter 1.

Further, the prediction awareness module 601 may calculate, according to the score F1, the score F2, and the score F3, the quality of service score 1 of the television 702 when executing the audio playing service by using the device parameter 1. Certainly, the prediction awareness module 601 may further obtain, according to the foregoing method, a quality of service score 2 when the loudspeaker box 703 uses the device parameter 2 to execute the audio playing service, and a quality of service score 3 when the television 705 uses the device parameter 3 to execute the audio playing service.

After obtaining the quality of service score 1, the quality of service score 2, and the quality of service score 3, the prediction awareness module 601 of the mobile phone may determine, according to these quality of service scores, the recommended device corresponding to the current audio playing service. For example, if the quality of service score 2>the quality of service score 1>the quality of service score 3, it indicates that quality of service of executing the audio playing service by the loudspeaker box 703 is higher than quality of service of executing the audio playing service by the current television 702, the prediction awareness module 601 may determine the loudspeaker box 703 as a recommended device. In this case, still as shown in FIG. 8, the prediction awareness module 601 may report an identifier of the determined recommended device (that is, the loudspeaker box 703) to the running APP (that is, the music APP).

Figure 11:
FIG. 11 is a schematic diagram 4 of an application scenario of an electronic device according to an embodiment of this application.

Further, as shown in FIG. 11, the music APP may display a prompt message 1101 on a display interface 1101 according to the recommended device reported by the prediction awareness module 601. The prompt message 1101 is used to prompt the user to use the loudspeaker box 703 with higher quality of service to execute the current audio playing service. For example, the prompt message 1101 may include an identifier 1102 of the loudspeaker box 703. In this way, in the distributed scenario, the user may perceive, by using the prompt message 1101, quality of service when another slave device executes a service. Subsequently, if it is detected that the user taps the identifier 1102 of the loudspeaker box 703, the mobile phone may switch the current audio playing service to the loudspeaker box 703 to continue to execute the audio playing service, and stop continuing to execute the audio playing service on the television 702, thereby improving quality of service of the audio playing service.

Figure 12:
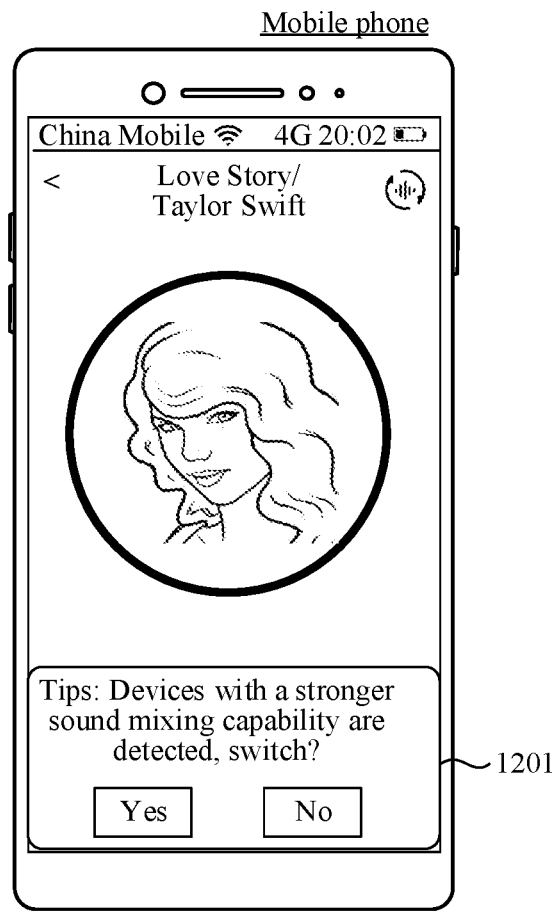
FIG. 12 is a schematic diagram 5 of an application scenario of an electronic device according to an embodiment of this application.

In some embodiments, the prediction awareness module 601 of the mobile phone may also determine a corresponding recommended device according to a quality of service score of a device parameter. For example, if a score of a device parameter of the sound mixing policy of the loudspeaker box 703 is higher than a score of a device parameter of a sound mixing policy of another slave device, a score of a device parameter of the sound effect algorithm of the television 702 is higher than a score of a device parameter of a sound effect algorithm of another slave device, it indicates that a sound mixing capability of the loudspeaker box 703 is relatively high, and a sound effect processing capability of the television 702 on audio data is relatively high. In this case, the prediction awareness module 601 may use the loudspeaker box 703 as a recommended device, and notify the music APP that a sound mixing capability of the loudspeaker box 703 is higher than that of another slave device. Further, as shown in FIG. 12, the music APP may prompt, in a prompt message 1201, the user that the loudspeaker box 703 has a stronger sound mixing capability in the audio playing service. Certainly, the music APP may further prompt the user, in the prompt message 1201, that the television 702 that currently plays the audio data has a stronger sound effect processing capability.

In this way, in the distributed scenario, the user may perceive different service capabilities when different slave devices execute a service, so as to selectively select a corresponding slave device to execute the service.

Alternatively, the prediction awareness module 601 may notify another APP of the determined recommended device (for example, the loudspeaker box 703), for example, notify a system APP such as a notification center APP. By using the notification center APP as an example, after the notification center APP receives the identifier of the recommended device sent by the prediction awareness module 601, similar to FIG. 11 or FIG. 12, the notification center APP may notify the user in a form of a notification message to use the loudspeaker box 703 with higher quality of service to execute the current audio playing service. This is not limited in this embodiment of this application.

Figure 13:
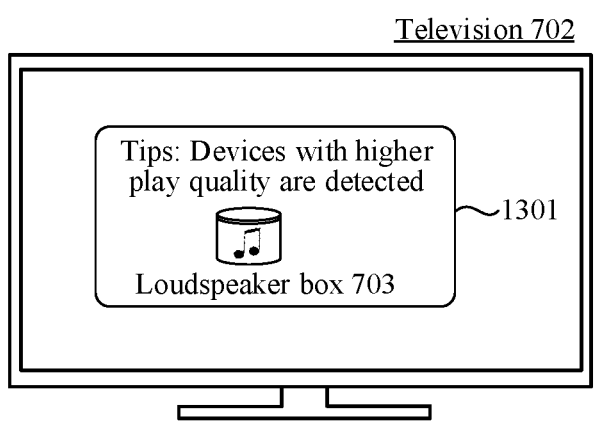
FIG. 13 is a schematic diagram 6 of an application scenario of an electronic device according to an embodiment of this application.

Alternatively, the prediction awareness module 601 may further notify, by using a corresponding DMSDP HAL 1, the determined recommended device to the television 702 that is executing the audio playing service. Further, as shown in FIG. 13, after obtaining the identifier of the recommended device sent by the mobile phone, the television 702 may display a prompt message 1301, prompting the user to use the loudspeaker box 703 with higher quality of service to execute the current audio playing service. Subsequently, if the television 702 detects that the user selects the identifier of the loudspeaker box 703 in the prompt message 1301, the television 702 may stop executing the audio playing service. In addition, the television 702 may send a service switching message to the mobile phone, so that the mobile phone may switch the current audio playing service to the loudspeaker box 703 in response to the service switching message, so as to continue to execute the current audio playing service, thereby improving quality of service of the audio playing service.

Certainly, if the prediction awareness module 601 determines that the television 702 currently executing the audio playing service is the device with the highest quality of service, the prediction awareness module 601 may notify the music APP that the television 702 currently executing the audio playing service is the optimal device. In this case, the mobile phone or the television 702 may no longer recommend another device to execute the audio playing service to the user.

In some other embodiments, the prediction awareness module 601 of the mobile phone may predict a quality of service score when each slave device (for example, the television 702, the loudspeaker box 703, and the television 705) executes the audio playing service, and may further predict a quality of service score when the mobile phone itself executes the audio playing service.

For example, the prediction awareness module 601 of the mobile phone may further obtain a device parameter 4 associated with the current audio playing service, that is, a quantity of speakers in the mobile phone, a sound effect algorithm, and a sound mixing policy. Further, the prediction awareness module 601 may predict, according to the foregoing method, a quality of service score 4 of the mobile phone when executing the audio playing service by using the device parameter 4. Subsequently, the prediction awareness module 601 may determine the current recommended device with reference to the quality of service score 4 and the quality of service score corresponding to each slave device. That is, the master device (that is, the mobile phone) may also be used as a candidate device of the recommended device. When the master device executes the target service (for example, the audio playing service), quality of service is relatively high, the user may be prompted to use the master device to execute the foregoing target service.

In the foregoing embodiment, the audio playing service is used as an example for description. It may be understood that when the mobile phone executes another service in the distributed scenario, a recommended device with higher quality of service may also be recommended to the user by using the foregoing method to execute another service.

Figure 14:
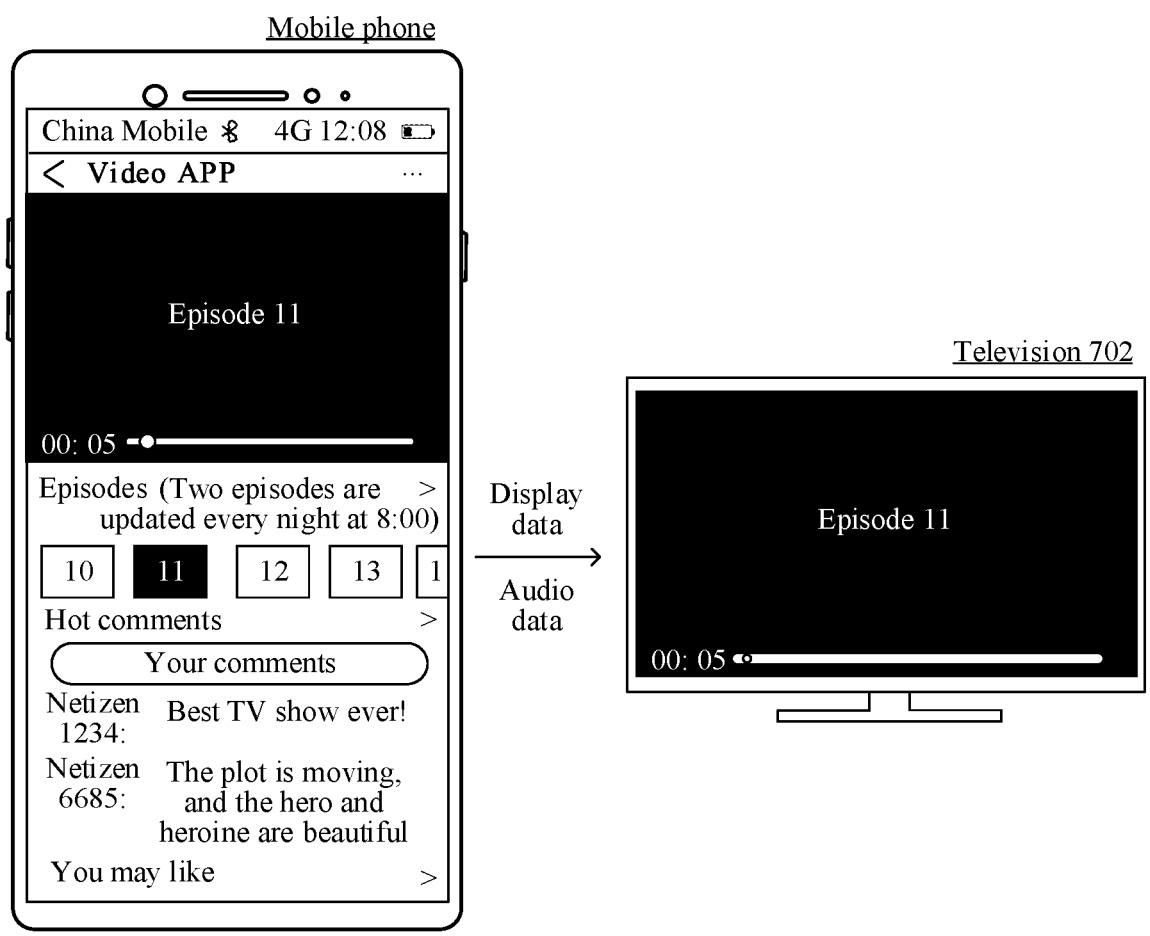
FIG. 14 is a schematic diagram 7 of an application scenario of an electronic device according to an embodiment of this application.

For example, as shown in FIG. 14, when the mobile phone runs a video APP, the mobile phone may project, in response to a screen projection operation performed by the user, a video B played in the video APP to the television 702. In a screen projection process, the mobile phone may send display data of the video B to the television 702 by using the DMSDP HAL 1, and the mobile phone may send audio data of the video B to the television 702 by using the DMSDP HAL 1.

In addition, in the screen projection process, the prediction awareness module 601 of the mobile phone may recognize that a current target service is a video playing service. Further, the prediction awareness module 601 may determine device parameters associated with the video playing service according to the correspondence shown in Table 1. For example, the device parameters associated with the video playing service may include a display parameter related to a display function, such as a resolution of the display screen, and may further include an audio parameter related to an audio function, such as a quantity of microphones and a sound effect algorithm.

Still using an example in which the slave devices of the mobile phone include the television 702, the loudspeaker box 703, and the television 705, after determining the device parameters associated with the video playing service, the prediction awareness module 601 of the mobile phone obtains the device parameters associated with the video playing service from each slave device by using the corresponding DMSDP HAL. Further, the prediction awareness module 601 may predict, according to the method in the foregoing embodiment, a quality of service score of each slave device when executing the video playing service according to the obtained device parameters, and determine a corresponding recommended device according to the quality of service score of each slave device when executing the video playing service.

For example, if the quality of service score of the television 705 when executing the video playing service is higher than the quality of service score of the television 702 when executing the video playing service, and the quality of service score of the television 705 when executing the video playing service is higher than the quality of service score of the loudspeaker box 703 when executing the video playing service, the prediction awareness module 601 may determine the television 705 as the current recommended device for executing the video playing service.

Figure 15:
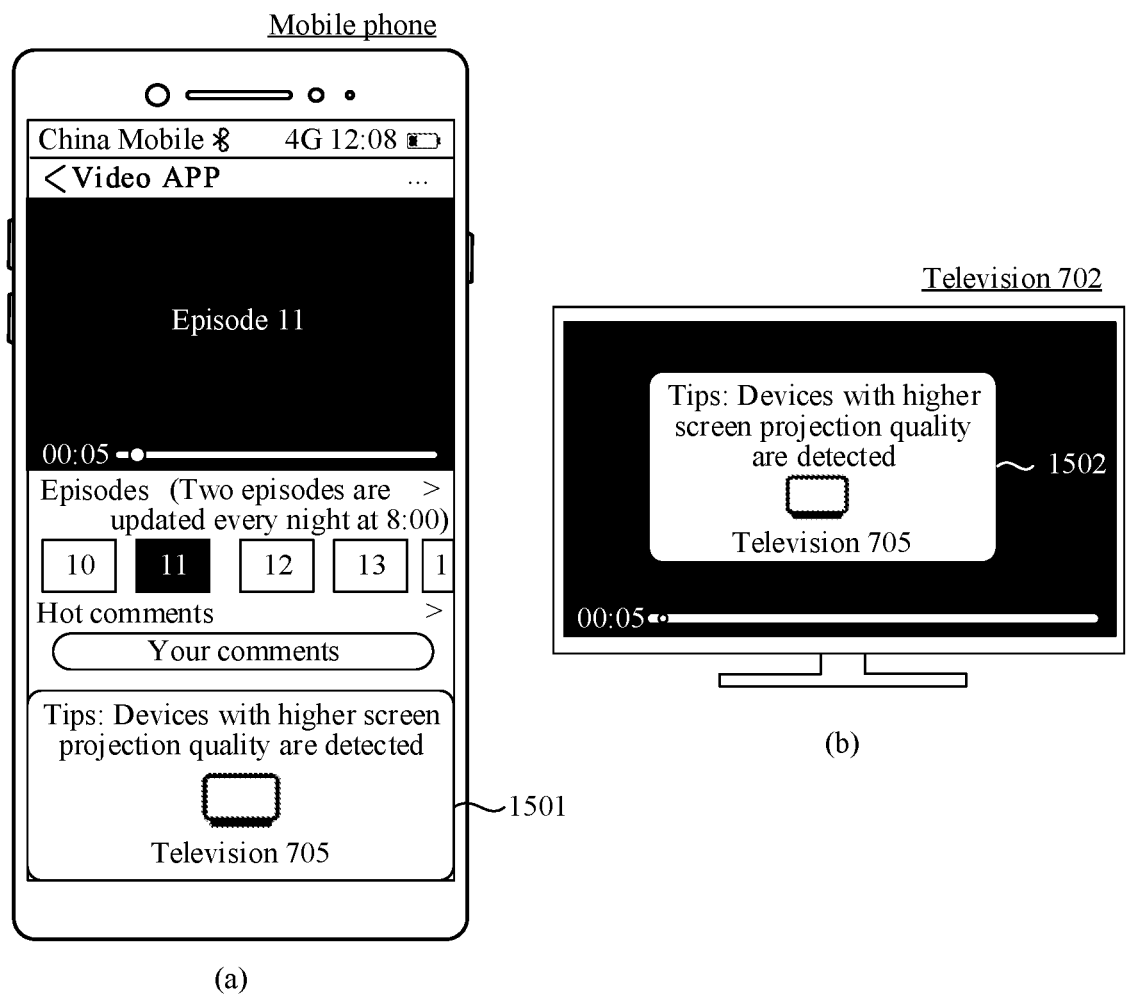
FIG. 15 is a schematic diagram 8 of an application scenario of an electronic device according to an embodiment of this application.

Further, as shown in (a) in FIG. 15, the prediction awareness module 601 may notify the video APP that the current recommended device is the television 705, so that the video APP may display a prompt message 1501 on the display interface, and prompt the user to use the television 705 with higher quality of service to execute the current video playing service. The prompt message 1501 may include an identifier of the television 705. If it is detected that the user taps the identifier of the television 705, the mobile phone may switch the current video playing service to the television 705 to continue to execute the video playing service, and stop continuing to execute the video playing service on the television 702, thereby improving quality of service of the current video playing service.

Alternatively, as shown in (b) in FIG. 15, the prediction awareness module 601 may notify, by using a corresponding DMSDP HAL 1, the determined recommended device to the television 702 that is executing the video playing service. After determining that the currently recommended device for executing the video playing service is the television 705, the television 702 may display a prompt message 1502, so as to prompt the user to use the television 705 with higher quality of service to execute the current video playing service. Similarly, if the television 702 detects that the user selects the identifier of the television 705 in the prompt message 1502, the television 702 may stop executing the video playing service. In addition, the television 702 may send a service switching message to the mobile phone, so that the mobile phone may switch the current video playing service to the television 705 in response to the service switching message, so as to continue to execute the current video playing service, thereby improving quality of service of the audio playing service.

Certainly, if the prediction awareness module 601 determines that the television 702 currently executing the video playing service is the device with the highest quality of service, the prediction awareness module 601 may notify the video APP that the television 702 currently executing the video playing service is the optimal device. In this case, the mobile phone or the television 702 may no longer recommend another device to execute the video playing service to the user.

In some other embodiments, the prediction awareness module 601 of the mobile phone may also determine, according to quality of service scores of different device parameters in different slave devices, a plurality of slave devices to execute the current video playing service (that is, the target service). In this case, there may be a plurality of recommended devices determined by the prediction awareness module 601.

For example, the prediction awareness module 601 may obtain the device parameter 1 associated with the video playing service from the television 702. The device parameter 1 includes an audio parameter and a display parameter of the television 702. Similarly, the prediction awareness module 601 may obtain the device parameter 2 associated with the video playing service from the loudspeaker box 703. The device parameter 2 includes an audio parameter and a display parameter of the loudspeaker box 703. If the prediction awareness module 601 scores the quality of service of the display parameter in the device parameter 1 higher than the quality of service of the display parameter in the device parameter 2, it indicates that the display capability of the television 702 is higher than the display capability of the loudspeaker box 703. If the prediction awareness module 601 scores the quality of service of the audio parameter in the device parameter 2 higher than the quality of service of the audio parameter in the device parameter 1, it indicates that the audio capability of the loudspeaker box 703 is higher than the display capability of the television 702.

Figure 16:
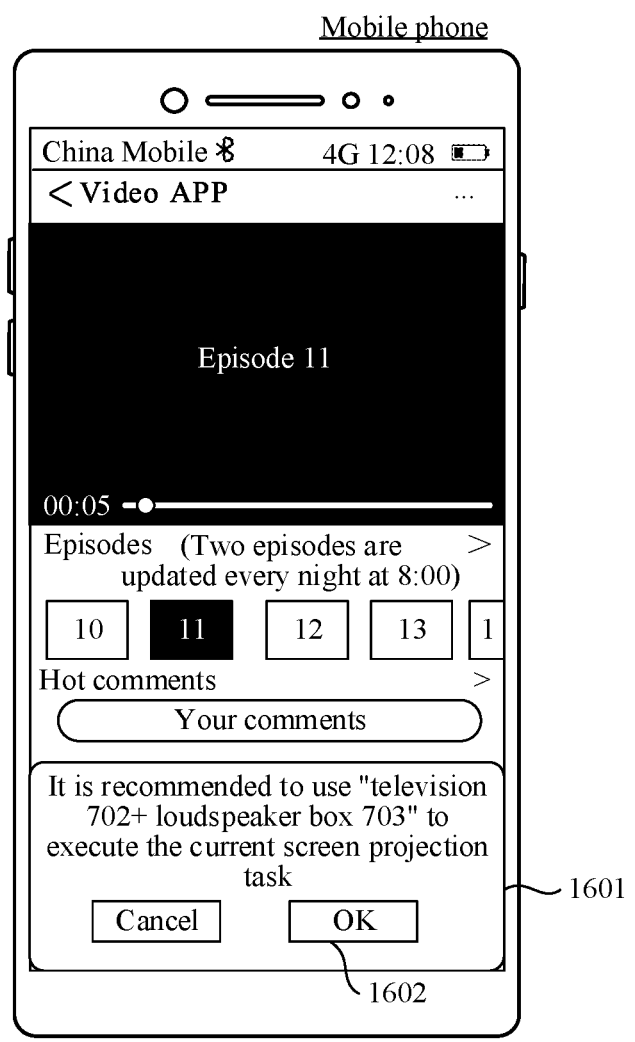
FIG. 16 is a schematic diagram 9 of an application scenario of an electronic device according to an embodiment of this application.

In this case, the prediction awareness module 601 may determine both the loudspeaker box 703 and the television 702 as the recommended devices, where the television 702 may be configured to execute the first subtask related to the display function in the video playing service, and the loudspeaker box 703 may be configured to execute the second subtask related to the audio function in the video playing service. Further, the prediction awareness module 601 may notify the video APP of the mobile phone that the television 702 is a recommended device for executing the first subtask, and the loudspeaker box 703 is a recommended device for executing the second subtask. Further, as shown in FIG. 16, the video APP may display a prompt message 1601 according to the recommended device notified by the prediction awareness module 601. The prompt message 1601 may prompt the user to use a device group including "television 702+loudspeaker box 703" to execute the video playing service, so that the user can enjoy optimal video play quality of service.

Subsequently, if it is detected that the user selects an OK button 1602 in the prompt message 1601, the mobile phone may switch the display data in the playing video B to the television 702 (that is, the first subtask in the video playing service is switched to the television 702), and at the same time, switch the audio data in the video B to the loudspeaker box 703 (that is, the second subtask in the video playing service is switched to the loudspeaker box 703) to improve the quality of service of the video playing service in a multi-device coordinated manner.

That is, the master device (for example, the mobile phone) may divide the current target service into a plurality of subtasks, and further determine an optimal recommended device for each subtask according to device parameters of each slave device, so as to distribute the target service to the plurality of recommended devices for execution, and improve quality of service of the target service in a multi-device coordinated manner.

In addition to the foregoing audio playing service and video playing service, the mobile phone may recommend a corresponding recommended device according to the device parameter of the slave device, and when the mobile phone executes a service related to a camera function, the mobile phone may also recommend a recommended device of higher quality of service to the user according to the foregoing method.

Figure 17:
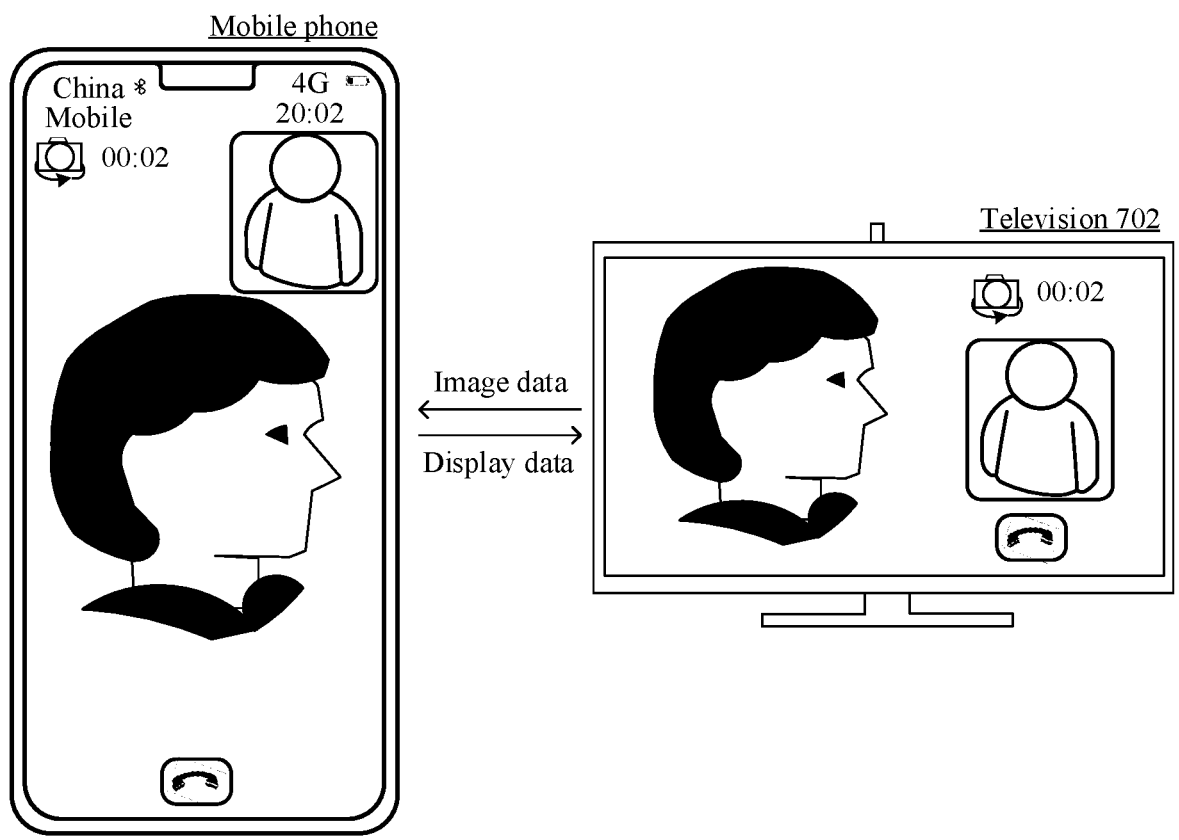
FIG. 17 is a schematic diagram 10 of an application scenario of an electronic device according to an embodiment of this application.

For example, when the mobile phone runs the WeChat APP, the user may enable a video call function of the WeChat APP to perform a video call with a contact (for example, a contact Sam). As shown in FIG. 17, in a video call process, the mobile phone may collect image data by using a camera of the television 702, and the mobile phone may display a video call interface by using a display screen of the television 702. In this case, the mobile phone may obtain, by using the DMSDP HAL 1, the image data collected by the camera of the television 702, and the mobile phone may send, by using the DMSDP HAL 1, the display data of the video call interface to the television 702 for display.

In the video call process, the prediction awareness module 601 of the mobile phone may recognize that the current target service is a video call service. Further, the prediction awareness module 601 may determine device parameters associated with the video call service according to the correspondence shown in Table 1. For example, the device parameters associated with the video call service may include a display parameter related to a display function, such as a resolution of a display screen, may further include an audio parameter related to an audio function, such as a quantity of microphones and a sound effect algorithm, may further include a camera parameter related to a camera function, and may further include a parameter such as a delay.

Still using an example in which the slave devices of the mobile phone include the television 702, the loudspeaker box 703, and the television 705, after determining the device parameters associated with the video call service, the prediction awareness module 601 of the mobile phone obtains the device parameters associated with the video call service from each slave device by using the corresponding DMSDP HAL. Further, the prediction awareness module 601 may predict, according to the method in the foregoing embodiment, a quality of service score of each slave device when executing the video call service, and determine the recommended device according to the quality of service score of each slave device when executing the video call service.

For example, if the quality of service score of the television 705 when executing the video call service is higher than the quality of service score of the television 702 when executing the video call service, and the quality of service score of the television 705 when executing the video call service is higher than the quality of service score of the loudspeaker box 703 when executing the video call service, the prediction awareness module 601 may determine the television 705 as the current recommended device for executing the video call service.

Figure 18:
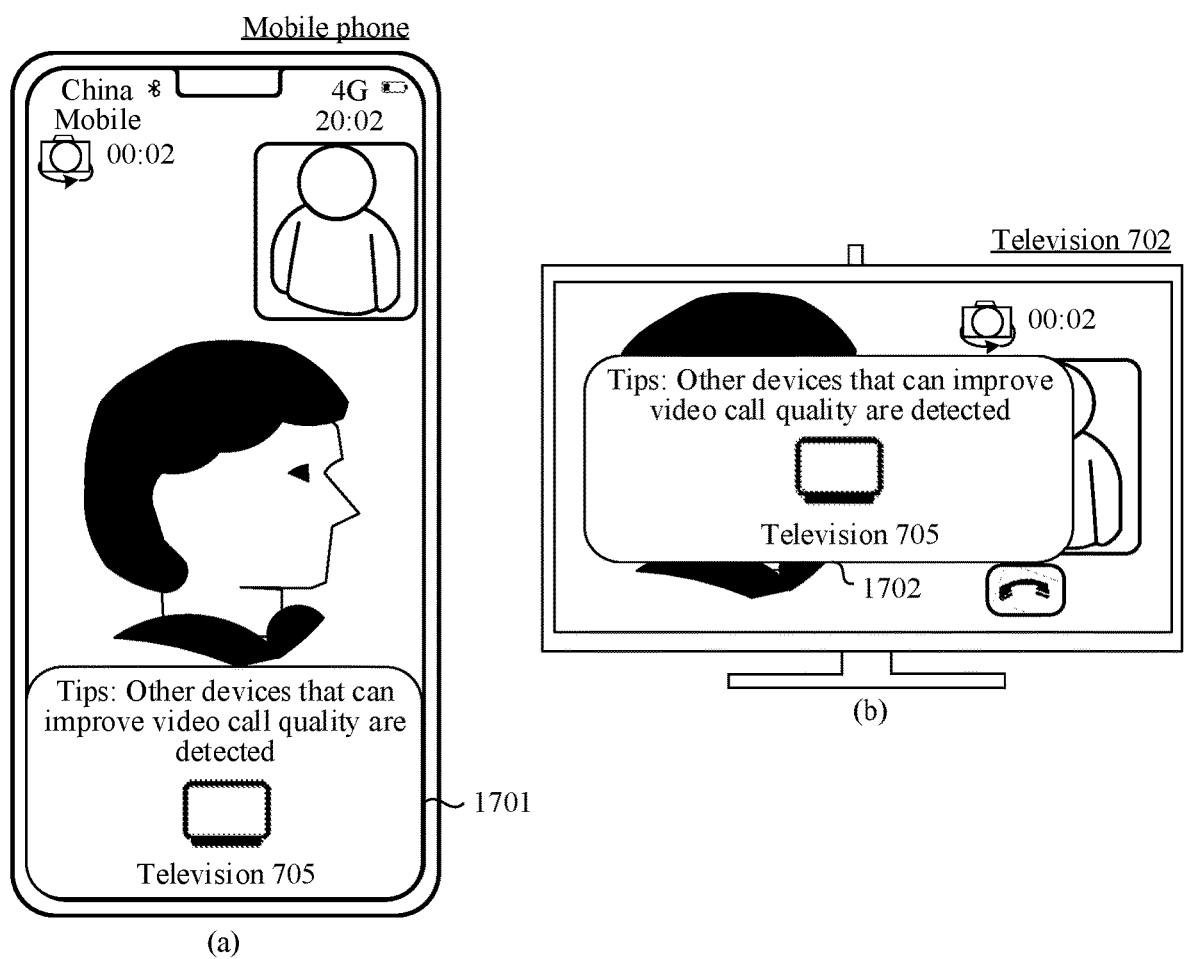
FIG. 18 is a schematic diagram 11 of an application scenario of an electronic device according to an embodiment of this application.

Further, as shown in (a) in FIG. 18, the prediction awareness module 601 may notify the WeChat APP that the current recommended device is the television 705, so that the WeChat APP may display a prompt message 1701 on the display interface, and prompt the user to use the television 705 with higher quality of service to execute the current video call service. Alternatively, as shown in (b) in FIG. 18, the prediction awareness module 601 may notify, by using the corresponding DMSDP HAL 1, the determined recommended device to the television 702 that is executing the video call service, and the television 702 displays a prompt message 1702, so as to prompt the user to use the television 705 with higher quality of service to execute the current video call service.

In addition, for a service with a relatively high real-time requirement such as a video call service, a live streaming service, or a karaoke service, the prediction awareness module 601 of the mobile phone may further predict a delay required for executing the corresponding service, and recommend a corresponding recommended device based on the predicted delay. That is, for a service with a relatively high real-time requirement, a delay required for each device to execute the service may be used as a determining criterion of quality of service. For example, when calculating the quality of service score of executing the service by each device, the mobile phone may set a weight value of the device parameter of the delay to 1. In this case, the quality of service of the current service is completely dependent on the device parameter of the delay.

Still using a video call service as an example, after recognizing that the current target service is the video call service, the prediction awareness module 601 of the mobile phone may obtain a network delay between the mobile phone and each slave device, and a processing delay of executing the video call service by each slave device. In this way, in the distributed scenario, a delay of executing the video call service by each slave device is a sum of a network delay and a processing delay.

For example, a network connection between the television 702 and the mobile phone is a Wi-Fi connection. The prediction awareness module 601 of the mobile phone may invoke a Wi-Fi HAL to detect a network delay L11 between the mobile phone and the television 702. In addition, the prediction awareness module 601 may obtain, from the television 702 by using the DMSDP HAL 1, a processing delay L12 of executing the video call service by the television 702. Further, the prediction awareness module 601 may calculate a delay L1=L11+L12 of executing the video call service by the television 702. Similarly, the prediction awareness module 601 may further calculate, by using the foregoing method, a delay L2 of executing the video call service by the loudspeaker box 703 and a delay L3 of executing the video call service by the television 705.

Figure 19:
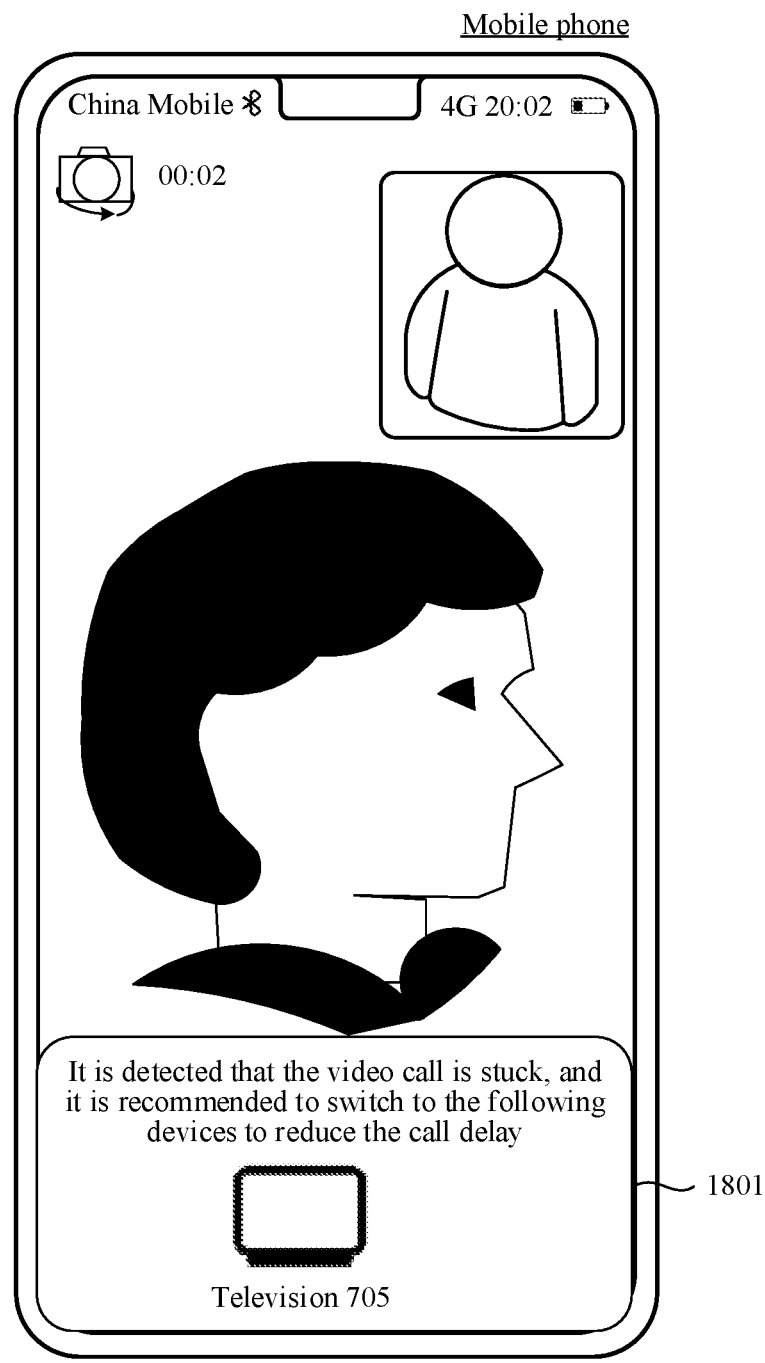
FIG. 19 is a schematic diagram 12 of an application scenario of an electronic device according to an embodiment of this application.

For example, if a quality parameter of a delay in the video call service is set in Table 2 to be within 500 ms, it indicates that a delay within 500 ms can meet a quality of service requirement of the video call service. In this case, if the prediction awareness module 601 of the mobile phone calculates that the delay L1 of executing the video call service by the television 702 is greater than 500 ms, and the delay L3 of executing the video call service by the television 705 is less than 500 ms, the prediction awareness module 601 may determine the television 705 as a recommended device of the current video call service. In this case, as shown in FIG. 19, the prediction awareness module 601 may notify the WeChat APP that the current recommended device is the television 705, so that the WeChat APP displays a prompt message 1801 on the display interface according to the recommended device, and prompts the user to use the television 705 with a lower delay to execute the current video call service. Certainly, the prompt message may also be displayed on the television 702 that is executing the video call service, which is not limited in this embodiment of this application.

Figure 20:
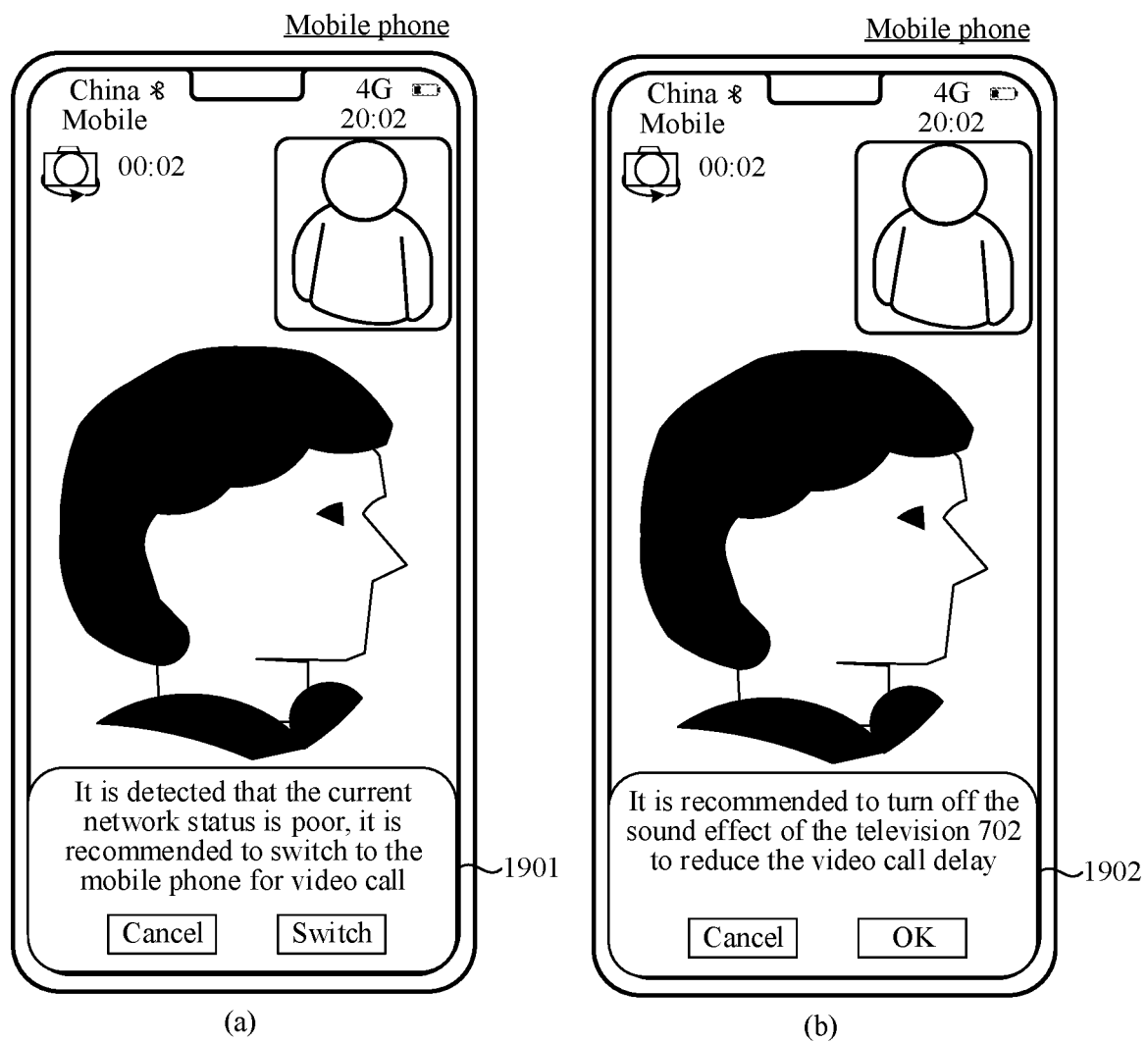
FIG. 20 is a schematic diagram 13 of an application scenario of an electronic device according to an embodiment of this application.

In some embodiments, when the delay L1 of executing the video call service by the television 702 is greater than 500 ms, the prediction awareness module 601 of the mobile phone may further analyze a specific reason that the delay L1 exceeds 500 ms. For example, if the delay L1 exceeds 500 ms because the network delay L11 between the television 702 and the mobile phone is greater than a threshold 1, it indicates that a current network status is relatively poor, and a delay during interaction with each slave device is relatively long, the prediction awareness module 601 may determine the mobile phone as a recommended device for executing the current video call service. In this case, as shown in (a) in FIG. 20, the prediction awareness module 601 may notify the WeChat APP (or the TV 702) in the mobile phone to display a prompt message 1901, and the prompt message 1901 prompts the user that the current network status is poor. It is recommended that the user use the mobile phone to execute the current video call service.

Alternatively, if the delay L1 exceeds 500 ms because the processing delay L12 of executing the video call service by the television 702 is greater than a threshold 2, the prediction awareness module 601 may simplify a processing process of executing the video call service by the television 702. For example, the prediction awareness module 601 may determine a video call policy 1, and in the video call policy 1, the television 702 does not need to perform sound effect processing on the audio data. In another example, the prediction awareness module 601 may determine a video call policy 2, and in the video call policy 2, the television 702 may perform coding and decoding processing on the display data by using a specified coding and decoding algorithm. Further, as shown in (b) in FIG. 20, the prediction awareness module 601 may notify the WeChat APP (or the television 702) in the mobile phone to display a prompt message 1902 according to the determined video call policy, and prompt the user in the prompt message 1902 to simplify the processing process of executing the video call service by the television 702, so as to reduce a delay of executing the video call service. Subsequently, if it is detected that the user selects the OK button 1903 in the prompt message 1902, the prediction awareness module 601 may send the video call policy to the television 702 by using the corresponding DMSDP HAL 1, so that the television 702 may simplify a processing process of executing the video call service according to the video call policy, thereby reducing a delay of an entire video call service and improving quality of service of the video call service.

Certainly, after determining the video call policy for simplifying the processing process of the video call service, the prediction awareness module 601 of the mobile phone may directly send the video call policy to the television 702, so that the television 702 can simplify the processing process of executing the video call service according to the video call policy. In this case, the mobile phone (or the television 702) may display a prompt message to prompt the user that the processing process of the video call service has been simplified, so as to reduce the delay of the entire video call service.

Alternatively, if the network delay L11 between the television 702 and the mobile phone is greater than the threshold 1, and the processing delay L12 of executing the video call service by the television 702 is greater than the threshold 2, the prediction awareness module 601 may select, from another slave device, a slave device whose execution delay of executing a video call service is less than 500 ms as the recommended device. Further, similar to FIG. 19, the prediction awareness module 601 may instruct the WeChat APP (or the TV 702) in the mobile phone to display a corresponding prompt message, and prompt the user to use the electronic device with a lower delay to execute the current video call service.

In the foregoing embodiment, an example in which the mobile phone as a master device recommends a recommended device more suitable for executing a service to the user in the process of executing the service in cooperation with a slave device. In some other embodiments, the mobile phone may further recommend, to the user in advance when detecting that the mobile phone is to perform a service as a master device, a recommended device that is more suitable for performing the service.

Figure 21:
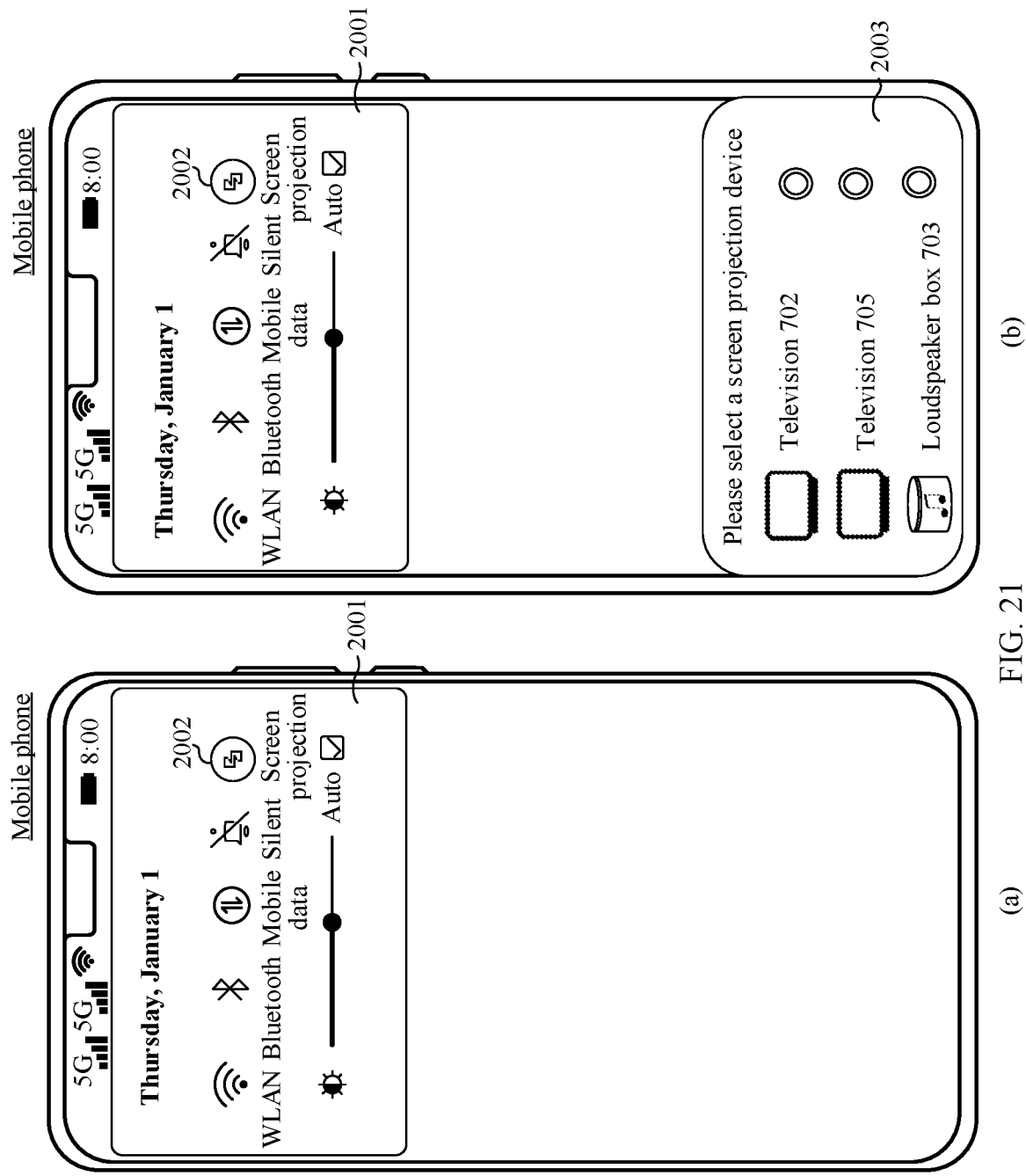
FIG. 21 is a schematic diagram 14 of an application scenario of an electronic device according to an embodiment of this application.

Still using an example in which the slave devices of the mobile phone include the television 702, the loudspeaker box 703, and the television 705, as shown in (a) in FIG. 21, a drop-down menu 2001 of the mobile phone may be set with a screen projection button 2002. If it is detected that the user taps the screen projection button 2002, it indicates that the screen projection function of the mobile phone is enabled to prepare to execute a screen projection service (for example, a video playing service). In this case, the prediction awareness module 601 of the mobile phone may obtain device parameters associated with the screen projection service from each slave device according to the method in the foregoing embodiment, and predict, according to the obtained device parameters, a quality of service score of each slave device when executing the screen projection service, so as to recommend a corresponding recommended device to the user according to the predicted quality of service score.

For example, when the prediction awareness module 601 predicts that the quality of service score 1 of the television 705 when executing the screen projection service is higher than the quality of service score 2 of the television 702 when executing the screen projection service, and the quality of service score 2 of the television 702 when executing the screen projection service is higher than the quality of service score 3 of the loudspeaker box 703 when executing the screen projection service, it indicates that the quality of service of the three slave devices such as the television 705, the television 702, and the loudspeaker box 703 when executing the screen projection services is successively reduced. Then, as shown in (b) in FIG. 21, the mobile phone may display a device list 2003 in response to an operation performed by the user by tapping the screen projection button 2002. In the device list 2003, all slave devices may be arranged in descending order of quality of service scores of executing the screen projection service. The user may select, from the device list 2003, a slave device to which content in the mobile phone is to be projected for play. In the foregoing arrangement sequence, the user may be recommended to use a device with a relatively high quality of service score to execute the current screen projection service, so as to improve quality of service of a subsequent screen projection service.

Figure 22:
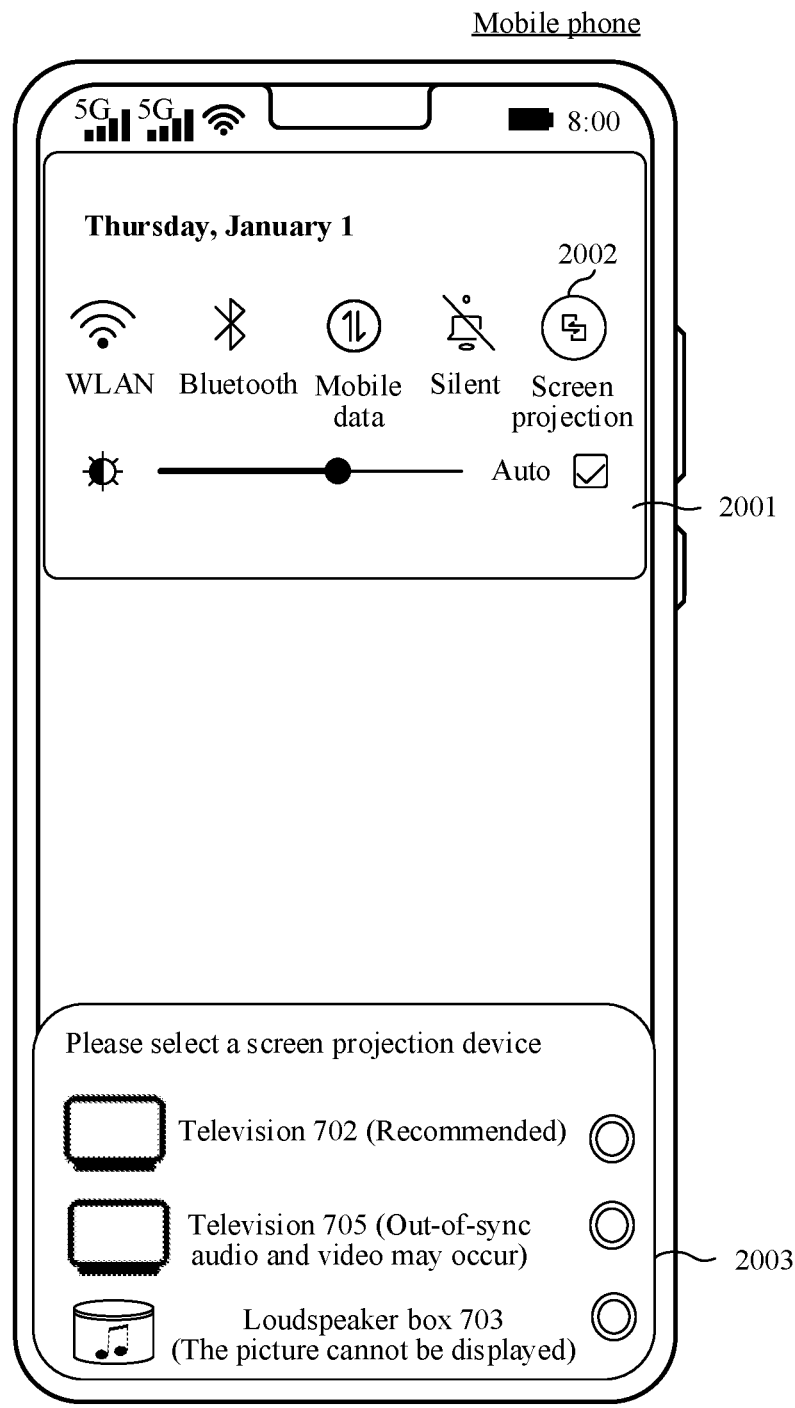
FIG. 22 is a schematic diagram 15 of an application scenario of an electronic device according to an embodiment of this application.

Alternatively, the prediction awareness module 601 of the mobile phone may predict, according to the obtained device parameters, specific quality of service of different slave devices when executing the screen projection service. For example, the prediction awareness module 601 may predict, according to device parameters of the television 702, that a phenomenon of out-of-syn audio and video may occur when the television 702 executes the screen projection service. In another example, the prediction awareness module 601 may predict, according to device parameters of the loudspeaker box 703, that the loudspeaker box 703 cannot display the display data when executing the screen projection service. Further, as shown in FIG. 22, the mobile phone may display a device list 2003 in response to an operation performed by the user by tapping the screen projection button 2002. In the device list 2003, the mobile phone may remind the user of specific quality of service of each slave device when executing the screen projection service.

That is, in the distributed scenario, before executing a service as a master device, the mobile phone may predict specific quality of service when the service is switched to each slave device for execution, so that when the user selects the slave device to execute the service, the user is reminded of the slave device with relatively good quality of service. In this way, before working cooperatively with a plurality of devices, the mobile phone may recommend, to the user, a recommended device suitable for executing the current service, so that the user can switch the current service to the recommended device for executing the current service, so as to improve quality of service when the plurality of devices work cooperatively in the distributed scenario, and improve user experience.

It should be noted that in the foregoing embodiment, an example in which the mobile phone is a master device in the distributed scenario is used. It may be understood that the master device in the distributed scenario may be an electronic device such as a tablet computer or a television. This is not limited in this embodiment of this application.

In addition, the foregoing embodiment uses the Android system as an example to describe a specific method for implementing positioning between function modules. It may be understood that a corresponding function module may be disposed in another operating system to implement the foregoing positioning method. All functions implemented by all devices and function modules similar to those in the embodiments of this application fall within the scope of the claims of this application and the equivalent technologies thereof.

An embodiment of this application discloses an electronic device, and the electronic device may be the master device (for example, the mobile phone) in the foregoing embodiment. The electronic device may specifically include a processor, and a memory, an input device, and an output device that are connected to the processor. The input device and the output device may be integrated into one device. For example, a touch sensor may be used as an input device, a display screen is used as an output device, and the touch sensor and the display screen are integrated into a touchscreen.

Figure 23:
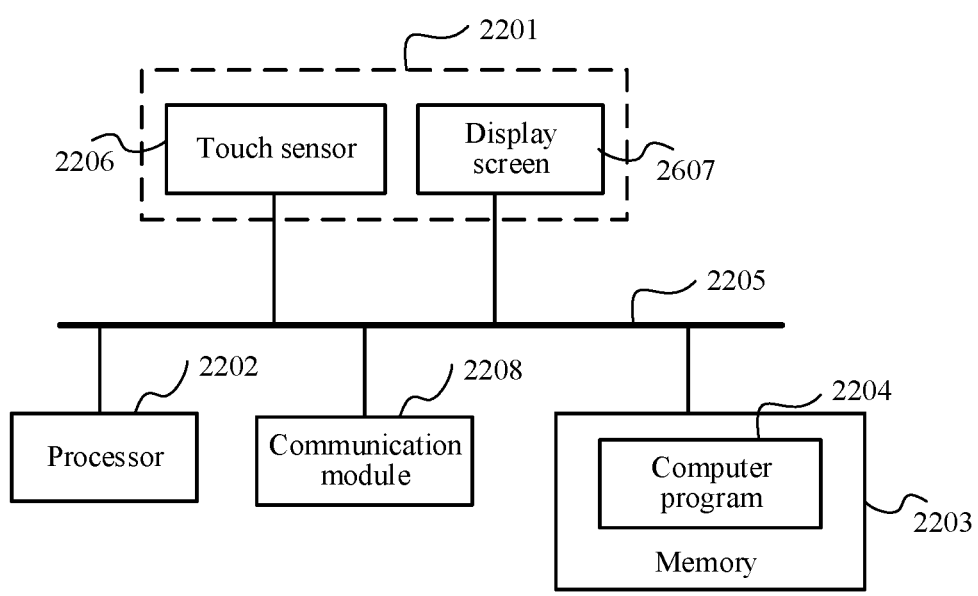
FIG. 23 is a schematic structural diagram 2 of an electronic device according to an embodiment of this application.

For example, as shown in FIG. 23, the electronic device may include a touchscreen 2201, where the touchscreen 2201 includes a touch sensor 2206 and a display screen 2207; one or more processors 2202; a memory 2203; a communication module 2208; one or more applications (not shown); and one or more computer programs 2204. The foregoing components may be connected by using one or more communication buses 2205. The one or more computer programs 2204 are stored in the memory 2203 and configured to be executed by the one or more processors 2202. The one or more computer programs 2204 include instructions, and the instructions may be used to execute related steps executed by the master device in the foregoing embodiment.

The processor 2202 may be specifically the processor 110 shown in FIG. 3, the memory 2203 may be specifically the internal memory 121 shown in FIG. 3, the display screen 2207 may be specifically the display screen 194 shown in FIG. 3, and the touch sensor 2206 may be specifically the touch sensor in the sensor module 180 shown in FIG. 3. This is not limited in this embodiment of this application.

According to the descriptions of the implementations, a person skilled in the art may clearly understand that, for the purpose of convenient and brief description, only division of the foregoing function modules is used as an example for description. In the practical application, the functions may be allocated to and completed by different function modules according to requirements. That is, an internal structure of the apparatus is divided into different function modules, to complete all or some of the functions described above. For specific work processes of the foregoing described system, apparatus, and unit, reference may be made to corresponding processes in the foregoing method embodiments, and details are not described herein again.

functional units in the embodiments of this application can be integrated into one processing unit, or each of the units can exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A device recommendation method, comprising:
receiving, by a first device, a first operation of enabling a first service by a user;
in response to the first operation, separately obtaining, by the first device from N electronic devices, device parameters associated with the first service, wherein the N electronic devices and the first device are located in a same communication network, and N is an integer greater than 0;
predicting, by the first device according to the device parameters, quality of service of executing the first service by each electronic device of the N electronic devices;
displaying, by the first device, a device list according to the quality of service of executing the first service by each electronic device in the N electronic devices, wherein the device list comprises a device identifier of at least one electronic device in the N electronic devices, and the N electronic devices comprise a second device;
receiving, by the first device, a second operation of selecting the second device from the device list by the user;
in response to the second operation, switching, by the first device, the first service to the second device for execution;
separately obtaining, by the first device, the device parameters associated with the first service from the N electronic devices;
predicting, by the first device according to the device parameters, the quality of service of executing the first service by each electronic device of the N electronic devices, wherein the second device is predicted to not be an electronic device with the highest quality of service of executing the first service in the N electronic devices and wherein the predicting, by the first device according to the device parameters, the quality of service of executing the first service by each electronic device of the N electronic devices comprises calculating, by the first device according to the device parameters, a quality of service score of executing the first service by each electronic device; and displaying, by the first device, a first prompt message, wherein the first prompt message is used to prompt the user to use a recommended device to execute the first service, and the recommended device is one or more of the N electronic devices; and notifying, by the first device the second device of the recommended device, so that the second device displays a second prompt message, wherein the second prompt message is used to prompt the user to use the recommended device to execute the first service.

2. The method according to claim 1, wherein the device parameters obtained by the first device from the second device comprise M parameters, and M is an integer greater than 0; and the predicting, by the first device according to the device parameters, the quality of service of executing the first service by the second device comprises:

determining, by the first device, M scores in a one-to-one correspondence with the M parameters; and calculating, by the first device according to the M scores, a quality of service score of executing the first service by the second device, wherein when the quality of service score is higher, the quality of service of the first service is higher.

3. The method according to claim 2, wherein the N electronic devices further comprise a third device; and when the quality of service score of executing the first service by the second device is higher than a quality of service score of executing the first service by the third device, an arrangement sequence of the second device in the device list is located before the third device.

4. The method according to claim 2, wherein the M parameters comprise a first parameter corresponding to a first function; and when a score of a first parameter of the second device is less than a score of a first parameter of another electronic device in the N electronic devices, the device list comprises second prompt information, and the second prompt information comprises a reason why a user is not recommended to use the second device to implement the first function.

5. The method according to claim 1, wherein the N electronic devices comprise a third device; and when a quality of service score of executing the first service by the third device is higher than that of another electronic device in the N electronic devices, the recommended device is the third device; or when a quality of service score of executing a first subtask in the first service by the third device is higher than that of another electronic device in the N electronic devices, the recommended device is the third device.

6. The method according to claim 1, wherein the first service comprises a first subtask and a second subtask, and the N electronic devices comprise a third device and a fourth device; and when a quality of service score of executing the first subtask by the third device is higher than that of another electronic device in the N electronic devices, and a quality of service score of executing the second subtask by the fourth device is higher than that of another electronic device in the N electronic devices, the recommended device is the third device and the fourth device.

7. The method according to claim 1, wherein the method further comprises:

predicting, by the first device, a quality of service score of executing the first service by the first device; and when the quality of service score of executing the first service by the first device is higher than those of the N electronic devices, the recommended device is the first device.

8. The method according to claim 1, wherein the first prompt message comprises a device identifier of the recommended device; and after the displaying, by the first device, the first prompt message, the method further comprises:

receiving, by the first device, a third operation of selecting the recommended device from the first prompt message by the user; and in response to the third operation, switching, by the first device, the first service to the recommended device for execution.

9. The method according to claim 1, wherein the device parameters comprise one or more of an audio parameter, a display parameter, a camera parameter, or a delay.

10. An electronic device, wherein the electronic device comprises:

one or more processors; and a memory;

wherein the memory stores instructions which when executed cause the electronic device to perform the following steps:

receiving a first operation of enabling a first service by a user;

in response to the first operation, separately obtaining device parameters associated with the first service from N electronic devices, wherein the N electronic devices and the electronic device are located in a same communication network, and N is an integer greater than 0;

predicting, according to the device parameters, quality of service of executing the first service by each electronic device of the N electronic devices; and displaying a device list according to the quality of service of executing the first service by each electronic device in the N electronic devices, wherein the device list comprises a device identifier of at least one electronic device in the N electronic devices, and the N electronic devices comprise a second device;

receiving a second operation of selecting the second device from the device list by the user;

in response to the second operation, switching the first service to the second device for execution;

separately obtaining the device parameters associated with the first service from the N electronic devices;

predicting, according to the device parameters, the quality of service of executing the first service by each electronic device of the N electronic devices; and displaying a first prompt message when the second device is not an electronic device with highest quality of service of executing the first service in the N electronic devices, wherein the first prompt message is used to prompt the user to use a recommended device to execute the first service, and the recommended device is one or more of the N electronic devices, wherein the predicting, according to the device parameters, the quality of service of executing the first service by each electronic device of the N electronic devices comprises calculating, according to the device parameters, a quality of service score of executing the first service by each electronic device, and when the second device is not an electronic device with highest quality of service of executing the first service in the N electronic devices, notifying the second device of the recommended device, so that the second device displays a second prompt message, wherein the second prompt message is used to prompt the user to use the recommended device to execute the first service.

11. The electronic device according to claim 10, wherein the device parameters obtained by the electronic device from the second device comprise M parameters, and M is an integer greater than 0; and when the instructions are executed, the electronic device further performs the following steps:

determining M scores in a one-to-one correspondence with the M parameters; and calculating, according to the M scores, a quality of service score of executing the first service by the second device, wherein when the quality of service score is higher, the quality of service of the first service is higher.

12. The electronic device according to claim 10, wherein the first service comprises a first subtask and a second subtask, and the N electronic devices comprise a third device and a fourth device; and when a quality of service score of executing the first subtask by the third device is higher than that of another electronic device in the N electronic devices, and a quality of service score of executing the second subtask by the fourth device is higher than that of another electronic device in the N electronic devices, the recommended device is the third device and the fourth device.

13. The electronic device according to claim 10, wherein the first prompt message comprises a device identifier of the recommended device; and when the instructions are executed, the electronic device further performs the following steps:

after the displaying a first prompt message, receiving a third operation of selecting the recommended device from the first prompt message by the user; and in response to the third operation, switching the first service to the recommended device for execution.

14. A non-transitory computer readable storage medium, wherein the computer readable storage medium stores instructions, and when the instructions run on an electronic device, the electronic device performs the following steps:

receiving a first operation of enabling a first service by a user;

in response to the first operation, separately obtaining device parameters associated with the first service from N electronic devices, wherein the N electronic devices and the electronic device are located in a same communication network, and N is an integer greater than 0;

predicting, according to the device parameters, quality of service of executing the first service by each electronic device of the N electronic devices; and displaying a device list according to the quality of service of executing the first service by each electronic device in the N electronic devices, wherein the device list comprises a device identifier of at least one electronic device in the N electronic devices, and the N electronic devices comprise a second device;

receiving a second operation of selecting the second device from the device list by the user;

in response to the second operation, switching the first service to the second device for execution;

separately obtaining the device parameters associated with the first service from the N electronic devices;

predicting, according to the device parameters, the quality of service of executing the first service by each electronic device of the N electronic devices; and displaying a first prompt message when the second device is not an electronic device with highest quality of service of executing the first service in the N electronic devices, wherein the first prompt message is used to prompt the user to use a recommended device to execute the first service, and the recommended device is one or more of the N electronic devices, wherein the predicting, according to the device parameters, the quality of service of executing the first service by each electronic device of the N electronic devices comprises calculating, according to the device parameters, a quality of service score of executing the first service by each electronic device, and when the second device is not an electronic device with highest quality of service of executing the first service in the N electronic devices, notifying the second device of the recommended device, so that the second device displays a second prompt message, wherein the second prompt message is used to prompt the user to use the recommended device to execute the first service.

15. The non-transitory computer readable storage medium according to claim 14, wherein the device parameters obtained by the electronic device from the second device comprise M parameters, and M is an integer greater than 0; and the predicting, according to the device parameters, the quality of service of executing the first service by the second device comprises:

determining M scores in a one-to-one correspondence with the M parameters; and calculating, according to the M scores, a quality of service score of executing the first service by the second device, wherein when the quality of service score is higher, the quality of service of the first service is higher.

16. The non-transitory computer readable storage medium according to claim 15, wherein the N electronic devices further comprise a third device; and when the quality of service score of executing the first service by the second device is higher than a quality of service score of executing the first service by the third device, an arrangement sequence of the second device in the device list is located before the third device.

17. The non-transitory computer readable storage medium according to claim 15, wherein the M parameters comprise a first parameter corresponding to a first function; and when a score of a first parameter of the second device is higher than a score of a first parameter of another electronic device in the N electronic devices, the device list comprises first prompt information, and the first prompt information is used to recommend a user to implement the first function by using the second device.

18. The non-transitory computer readable storage medium according to claim 14, wherein the N electronic devices comprise a third device; and when a quality of service score of executing the first service by the third device is higher than that of another electronic device in the N electronic devices, the recommended device is the third device; or when a quality of service score of executing a first subtask in the first service by the third device is higher than that of another electronic device in the N electronic devices, the recommended device is the third device.

19. The non-transitory computer readable storage medium according to claim 14, wherein the first service comprises a first subtask and a second subtask, and the N electronic devices comprise a third device and a fourth device; and when a quality of service score of executing the first subtask by the third device is higher than that of another electronic device in the N electronic devices, and a quality of service score of executing the second subtask by the fourth device is higher than that of another electronic device in the N electronic devices, the recommended device is the third device and the fourth device.

20. The non-transitory computer readable storage medium according to claim 14, wherein the device parameters comprise one or more of an audio parameter, a display parameter, a camera parameter, or a delay.

* * * * *